United States Patent
Chowdhary et al.

(10) Patent No.: US 8,843,883 B2
(45) Date of Patent: Sep. 23, 2014

(54) SYSTEM AND METHOD FOR MODEL-DRIVEN DASHBOARD FOR BUSINESS PERFORMANCE MANAGEMENT

(75) Inventors: Pawan Raghunath Chowdhary, Montrose, NY (US); Florian Alexandre Pinel, New York, NY (US); Themistoklis Palpanas, Trento (IT); Shyh-Kwei Chen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2035 days.

(21) Appl. No.: 11/619,549

(22) Filed: Jan. 3, 2007

(65) Prior Publication Data

US 2008/0163164 A1 Jul. 3, 2008

(51) Int. Cl.
*G06F 9/44* (2006.01)

(52) U.S. Cl.
USPC .......................................... 717/109; 717/105

(58) Field of Classification Search
CPC .............. G06F 8/30; G06F 8/34; G06F 8/35
See application file for complete search history.

(56) References Cited

U.S. PATENT DOCUMENTS

| | | | | |
|---|---|---|---|---|
| 7,131,107 B2* | 10/2006 | Wall et al. | ...................... | 717/105 |
| 7,137,100 B2* | 11/2006 | Iborra et al. | ................... | 717/106 |
| 7,313,782 B2* | 12/2007 | Lurie et al. | ..................... | 717/104 |
| 7,331,035 B2* | 2/2008 | Loos et al. | ..................... | 717/104 |
| 7,334,216 B2* | 2/2008 | Molina-Moreno et al. | ... | 717/109 |
| 7,555,742 B2* | 6/2009 | Iborra et al. | ................... | 717/101 |
| 7,584,451 B2* | 9/2009 | Iborra et al. | ................... | 717/101 |
| 7,665,061 B2* | 2/2010 | Kothari et al. | ................ | 717/106 |
| 7,941,438 B2* | 5/2011 | Molina-Moreno et al. | ... | 707/756 |
| 8,037,449 B2* | 10/2011 | Iborra et al. | ................... | 717/105 |
| 8,141,031 B2* | 3/2012 | Iborra et al. | ................... | 717/104 |
| 8,365,138 B2* | 1/2013 | Iborra et al. | ................... | 717/104 |
| 2002/0062475 A1* | 5/2002 | Iborra et al. | ................... | 717/108 |
| 2002/0100014 A1* | 7/2002 | Iborra et al. | ................... | 717/104 |
| 2002/0128891 A1 | 9/2002 | McSherry | | |
| 2003/0163329 A1* | 8/2003 | Bolene | ............................. | 705/1 |
| 2003/0167455 A1* | 9/2003 | Iborra et al. | ................... | 717/105 |
| 2004/0015832 A1* | 1/2004 | Stapp et al. | .................... | 717/106 |
| 2004/0133578 A1 | 7/2004 | Dickerson et al. | | |
| 2004/0204192 A1 | 10/2004 | Holloway et al. | | |

(Continued)

FOREIGN PATENT DOCUMENTS

| WO | WO 01/01206 A2 * | 1/2001 | ............. G05B 13/00 |
|---|---|---|---|
| WO | WO 2006043012 A1 * | 4/2006 | ............... G06F 9/44 |

OTHER PUBLICATIONS

Zeng et al., Model-Driven Business Performance Management, IEEE International Conference on e-Business Engineering 2005, pp. 1-10.*

(Continued)

*Primary Examiner* — Tuan Q. Dam
*Assistant Examiner* — Zheng Wei
(74) *Attorney, Agent, or Firm* — Daniel P. Morris; McGinn IP Law Group, PLLC

(57) ABSTRACT

A system, method, and framework resulting therefrom, for a model-driven dashboard for business performance management, which includes capturing business dashboard model requirements at a business model level by providing at least one user-customizable model for capturing functionality of a dashboard, and after the user defines the functionality of the dashboard using the at least one user-customizable model, automatically generating code for a deployable dashboard application.

18 Claims, 19 Drawing Sheets

(56) References Cited

U.S. PATENT DOCUMENTS

| | | |
|---|---|---|
| 2004/0225955 A1 | 11/2004 | Ly |
| 2005/0223021 A1* | 10/2005 | Batra et al. .................... 707/102 |
| 2005/0256752 A1 | 11/2005 | Ramachandran et al. |
| 2006/0015818 A1 | 1/2006 | Chaudhri et al. |
| 2006/0017975 A1* | 1/2006 | Ly et al. ........................ 358/1.18 |
| 2007/0124184 A1* | 5/2007 | Schmit et al. ..................... 705/7 |
| 2008/0209391 A1* | 8/2008 | Iborra et al. ................... 717/105 |
| 2009/0132995 A1* | 5/2009 | Iborra et al. ................... 717/106 |
| 2009/0183138 A1* | 7/2009 | Loos et al. .................... 717/105 |

OTHER PUBLICATIONS

Chen et al., A Model Driven XML Transformation Framework for Business Performance Managmenet, IEEE International Conference on e-Business Engineering 2005, pp. 1-8.*

Chowdhary et al., Model-Driven Dashboards for Business Performance Reporting, Proceedings of the 10th IEEE International Enterprise Distributed Object Computing Conference, 2006, pags 1-10.*

Chowdhary et al., Model Driven Development for Business Performance Management, IBM System Journal, vol. 45, No. 3, 2006, pp. 587-605.*

* cited by examiner

SYSTEM AND METHOD FOR MODEL-DRIVEN DASHBOARD FOR BUSINESS PERFORMANCE MANAGEMENT

BACKGROUND OF THE INVENTION

1. Field of the Invention

The present invention generally relates to a system and method of generating code for a model-driven dashboard for business performance management and dashboard resulting therefrom, and more particularly, to a system and method of capturing business model requirements at a business model level, including providing at least one user-customizable model (or a plurality thereof) for capturing functionality of a dashboard, and after the user defines the functionality of the dashboard using the at least one user-customizable model, automatically generating code for a deployable dashboard application.

2. Description of the Conventional Art

Enterprises are leveraging information technology solutions in order to increase their productivity and their business value in the marketplace. As they adopt the paradigm of describing and monitoring their business operations in a systematic manner, the need for visually representing such processes in a model becomes critical. Nowadays, many vendors provide sophisticated tools to represent business process models and business activity monitoring models.

In modern businesses, several of those processes and activities correspond to procedures that monitor and measure the performance of the business. Business Performance Management (BPM) generally includes a suite of components that are used to monitor the health of the business. BPM delivers significant benefits to the businesses, by offering them the ability to react promptly to changes in their environment. BPM is enabled by the level of automation and systems integration that is currently in place in the majority of businesses. The integration of various systems in the business allows for continuous monitoring of business performance, using carefully selected metrics, also known as Key Performance Indicators (KPIs).

For purposes of this disclosure, Key Performance Indicators (KPI) generally mean indicators that help organizations achieve organizational goals through the definition and measurement of progress. The KPIs generally are displayed to the analyst through a dashboard.

For purposes of this disclosure, a dashboard generally means a user interface that organizes and presents information in a way that is easy to read and interpret. Dashboards can be essential elements in the day-to-day operation of modern enterprises, as they provide to the analysts the view of all the critical business metrics that reflect the performance of the business.

In contrast to the usefulness, and ease of use, that dashboards represent, the amount of effort that is required for their development can sometimes be daunting. User interface development in general, and dashboard development too, can require a considerable investment of time, and can often take as much as 65-80% of the overall development time in a model-driven business transformation project.

SUMMARY OF THE INVENTION

The present inventors have recognized that business process and business performance modeling are becoming increasingly important as modern enterprises seek ways to exploit high level design and reasoning, as well as some degree of automation in the code generation process.

For example, the present inventors have recognized that the development of software using business and Information Technology (IT) models are gaining market share. Model-driven Business Performance Management (BPM) is one such example.

The present inventors also have recognized that BPM Dashboards are a critical component of business process and business performance modeling. However, conventional dashboards are custom designed with large development cycles and are not connected to Business Models.

The present inventors have recognized that a higher cost is needed to build and maintain such a dashboard if developed with conventional techniques. The present inventors have recognized a lack of business and IT dashboard models for representing business requirements. Also, it is difficult to translate such conventional dashboard models (if existing) into actual dashboard reports due to a lack of Meta Models.

The present inventors also have recognized that the problem of defining dashboard report templates as the structure of input data is unknown, and has not been addressed, in the conventional systems and methods.

The inventors have recognized that, while there may be a significant research effort towards these directions, the conventional systems and methods, to date, have focused on the problem of how to effectively model a business process, but have not addressed the problem of modeling the entire business performance monitoring process, from the source data to the dashboard (i.e., the user interface for the monitored metrics).

In view of the foregoing and other exemplary problems, drawbacks, and disadvantages of the conventional art methods and structures, an exemplary feature of the present invention is to provide an efficient and effective model-driven dashboard design system, method, and dashboard resulting therefrom, and more particularly, to capturing business dashboard model requirements at a business model level, including providing a plurality of user-customizable models for capturing functionality of a dashboard, and after the user defines the functionality of the dashboard using at least one of the plurality of user-customizable models, automatically generating code for a deployable dashboard application.

The present invention extends the business performance modeling framework by providing a number of new models that enable the process of dashboard design. The model-driven approach, according to the present invention, can render the dashboard design and deployment process less time-consuming and less cumbersome. The present invention can provide automated code generation, and allow fast and easy integration of the dashboard with the final solution.

The inventors of the present invention will describe the novel designing and deploying of a dashboard for a real-world business, as well as the results of such experiments, thereby demonstrating the feasibility and effectiveness of the present invention. The present invention can provide a significant reduction in terms of required development time when compared to a conventional dashboard deployment process.

In an exemplary aspect, the present invention can provide Business Dashboard Models (Unified Modeling Language 2 (UML2)) and IT level Meta Models.

In another exemplary aspect, the present invention can extend existing BPM Models (UML2 Profiles) to, for example:

Model User Roles to Metric Access.
Model User Roles to Data Access (via dimension).
Model User Roles to Report Template Access.
Model Metrics to the Report Templates.
Model Navigation and Access.

The present invention can define Meta Models (Extensible Markup Language (XML) Schema) to capture the modeling and dashboard report elements.

In another exemplary aspect, the present invention can provide software components for automatic transformation of the Models to the Actual Reports.

In yet another exemplary aspect, the present invention can provide Pre-defined static Data Templates and Plug-in components for defining Report Template.

The exemplary aspects of the present invention provide important advantages, such as, the capability of modeling very small set of data elements (facts, dimension, hierarchies, levels). Thus, the structure of the data can be limited to few predefined sets (Data Templates). The data access and filtering logic are deterministic in nature.

The exemplary aspects of the present invention can provide a mechanism to provide coarse and fine grain access to the data by roles. The context data to KPI's can be stored as dimensions. The exemplary model can allow roles to dimension level access (coarse grain access). At pre-runtime, the present invention can provide the ability to provide user to actual content access (via an administrator).

The present invention can provide a software component, can transform the model into meta models, and finally, into deployable reports. The software component can be provided as a tag library (plug-in) (or equivalent software component) for Report templates, for example, for auto generation of one of the predefined data sets, providing filtering functionality, etc.

The present invention can provide assistance to a Report template (user defined), for example, by selecting one of the data structure sets for the template, using provided tag library and Application Programming Interfaces (API's) to access the data, etc.

The conventional systems and methods generally deal with the dashboard at the data level, not at the modeling level.

One exemplary aspect of the invention is directed to a method of capturing business dashboard model requirements at a business model level, which includes automatically generating code for a deployable dashboard application based on providing a plurality of user-customizable models for capturing the functionality of a the deployable dashboard.

Another exemplary aspect of the invention is directed to a method of capturing business dashboard model requirements at a business model level, which includes providing a plurality of user-customizable models for capturing functionality of a dashboard, and after the user defines the functionality of the dashboard using at least one of the plurality of user-customizable models, automatically generating code for a deployable dashboard application.

Yet another exemplary aspect of the invention is directed to a tool for capturing business dashboard model requirements at a business model level and automatically generating code for a deployable dashboard application, wherein the tool includes a Rational Software Architect (RSA) Modeler.

A further exemplary aspect of the invention is directed to an Extensible Markup Language (XML) Schema for capturing business model requirements at a business model level and automatically generating code for a deployable dashboard application, wherein the Extensible Markup Language (XML) Schema defines an Information Technology (IT) Meta Model for capturing the user-customizable models.

Yet another exemplary aspect of the invention is directed a system for model-driven dashboard design, which includes at least one user-customizable model for capturing functionality of a dashboard, a dashboard code generator for automatically generating code for a deployable dashboard application after a user defines the functionality of the dashboard using at least one of the plurality of user-customizable models.

Still another exemplary aspect of the invention is directed to a dashboard framework for capturing business dashboard model requirements at a business model level and automatically generating code for a deployable dashboard application, which includes a dashboard model editor that edits a formal model that represents a dashboard report requirement based on artifacts of the formal model retrieved from a storage unit, a dashboard meta-model translator that transforms the formal model into a meta-model, and a dashboard code generator that automatically generates dashboard code for creating the deployable application.

Another exemplary aspect of the invention is directed to a computer-readable medium tangibly embodying a program of recordable, machine-readable instructions executable by a digital processing apparatus to perform the exemplary method according to the present invention.

Still another exemplary aspect of the invention is directed to a method of deploying computing infrastructure in which computer-readable code is integrated into a computing system, and combines with the computing system to perform the method according to the present invention.

BRIEF DESCRIPTION OF THE DRAWINGS

The foregoing and other exemplary purposes, aspects and advantages will be better understood from the following detailed description of an exemplary aspects of the invention with reference to the drawings, in which.

DETAILED DESCRIPTION OF EXEMPLARY ASPECTS OF THE INVENTION

Figure 1:
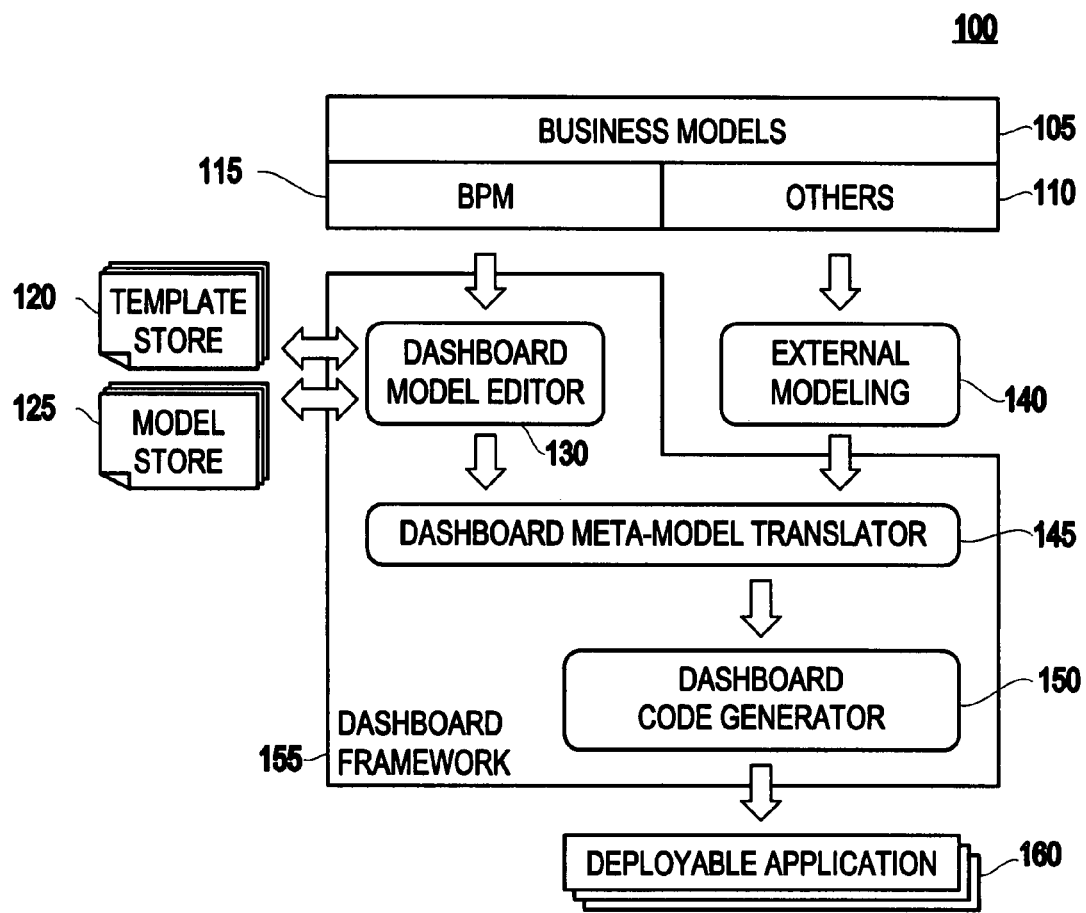
FIG. 1 illustrates an exemplary high level architecture 100 of model-driven dashboard framework 155, according to an exemplary, non-limiting aspect of the present invention.

Referring now to the drawings, and more particularly to FIGS. 1-23, there are shown exemplary aspects of the method and structures according to the present invention.

The present invention generally relates to a system and method of business performance modeling and model-driven business transformation.

For example, FIG. 1 illustrates an exemplary high level architecture 100 of model-driven dashboard framework 155, according to an exemplary, non-limiting aspect of the present invention. The present invention can provide business models 105, such as business performance management (BPM) models 115, as well as other models 110, which would be known and understood by the ordinarily skilled artisan. The present invention also can provide a template store 120 and a model store 125.

The model-driven dashboard framework 155 can include, for example, a dashboard model editor 130 which can be used to capture a representation of the dashboard models. The dashboard meta-model translator 145 can then be used to transform the dashboard model from the dashboard model editor 130 into a meta-model representation. The meta-model representation can be fed into the dashboard code generator 150, which can automatically generate a deployable dashboard application 160.

Moreover, the exemplary aspects of FIGS. 1 also can replace the BPM Observation Model (OM) with other business modeling approaches, without affecting the dashboard model, as exemplarily illustrated by the external modeling 140.

Figure 2:
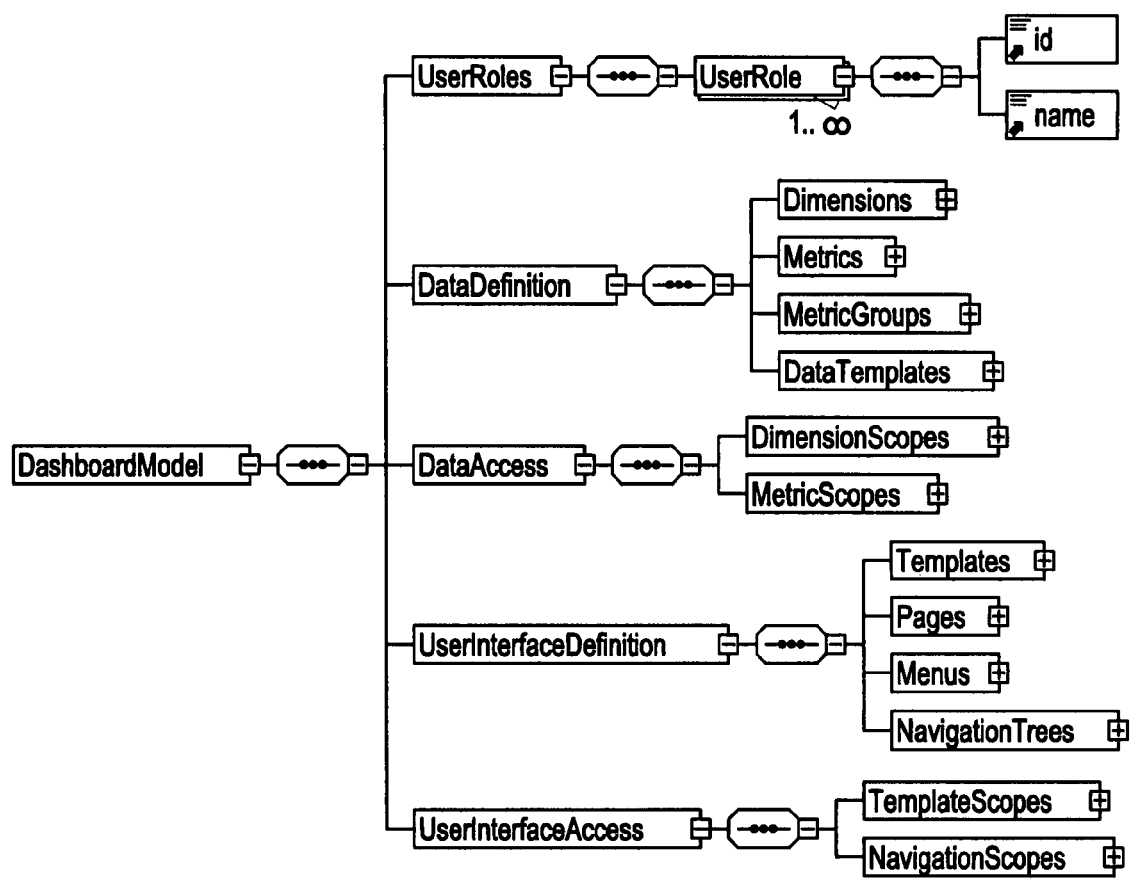
FIG. 2 illustrates an exemplary Business Performance Management (BPM) dashboard meta-model (XML schema) 200, according to an exemplary, non-limiting aspect of the present invention.

FIG. 2 illustrates an exemplary Business Performance Management (BPM) dashboard meta-model (extensible markup language (XML) schema) 200, according to the present invention. The present invention can use a Unified Modeling Language (UML) representation, or for example, an extensible markup language (XML).

Figure 3:
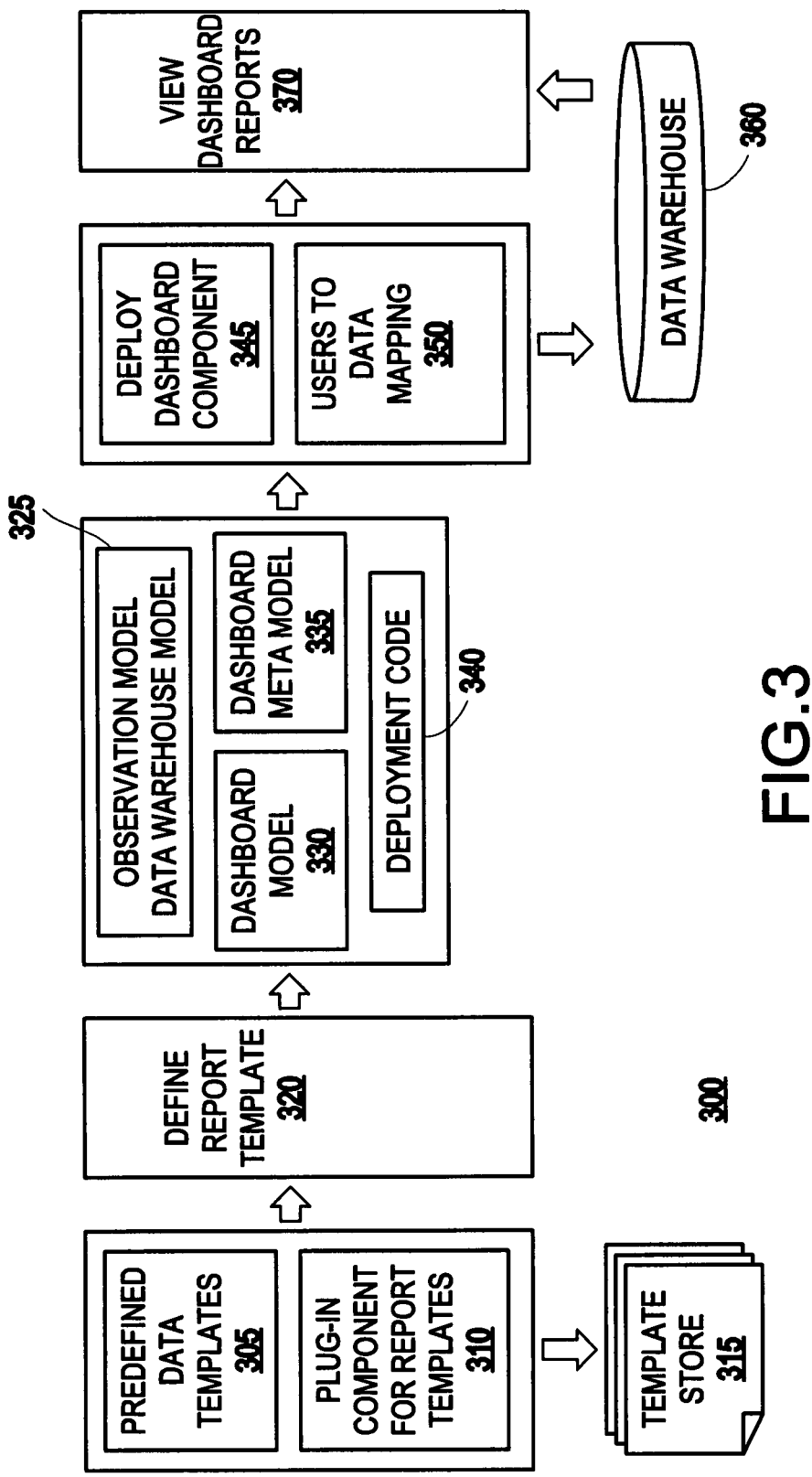
FIG. 3 illustrates an exemplary high-level end-to-end dashboard component flow diagram 300, according to an exemplary, non-limiting aspect of the present invention.

FIG. 3 illustrates an exemplary high-level end-to-end dashboard component flow diagram 300, according to the present invention. The exemplary dashboard modeling methodology, according to the present invention, can be divided in the following three main activities: 1. Pre-modeling activity (e.g., see also FIG. 10); 2. Modeling activity (e.g., see also FIG. 11); and 3. Post-modeling activity (e.g., see also FIGS. 12 and 13), each of which will be described below.

As exemplarily illustrated in FIG. 3, the present invention provides the user with the ability to define report templates 320, based on existing templates, or newly created templates (e.g., including a predetermined number, type, etc. of tables, charts, etc.). That is, the user can select predefined templates 305 or a plug-in component for report templates 310, from the template store 315.

Figure 10:
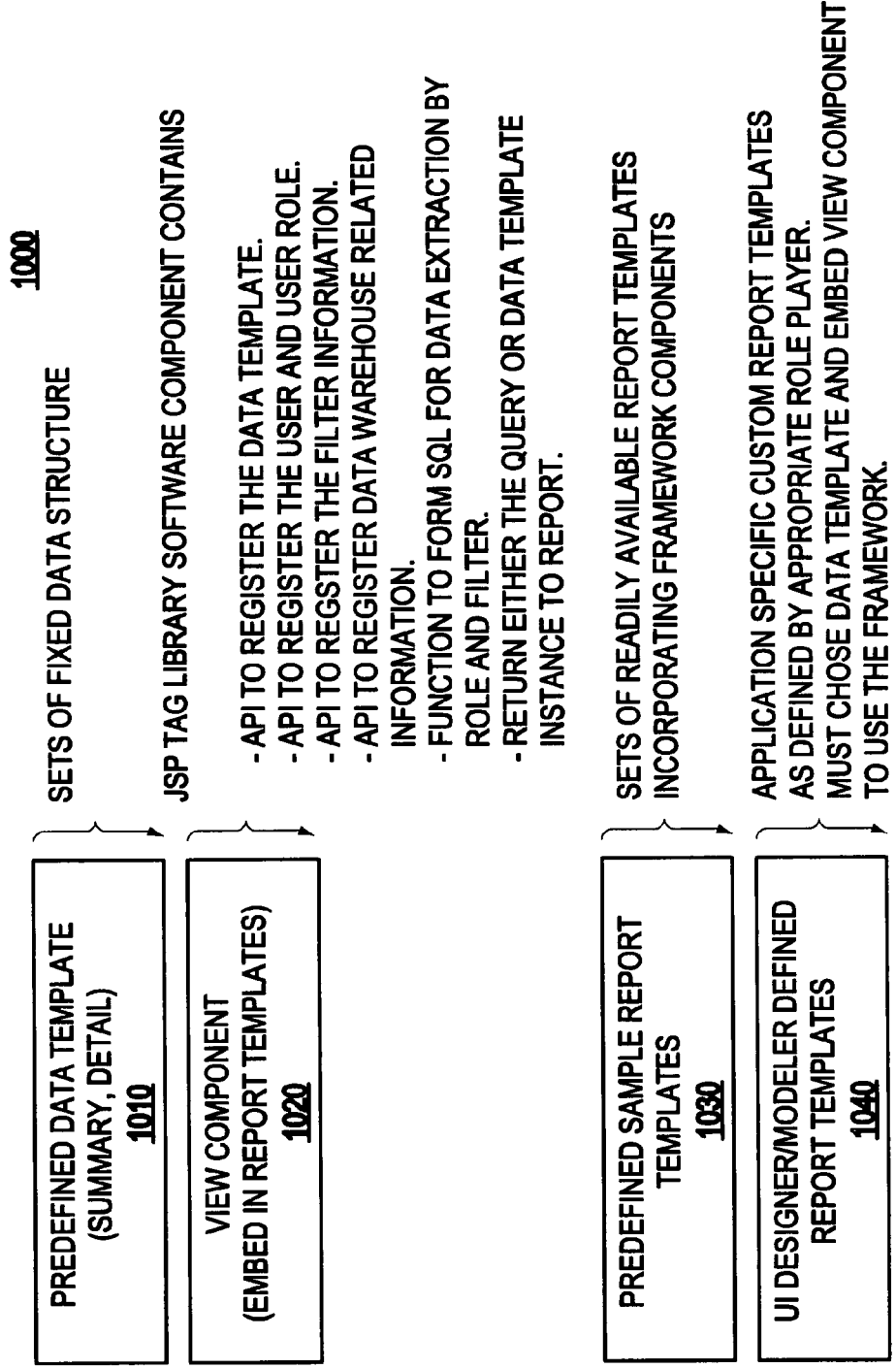
FIG. 10 illustrates an exemplary pre-modeling activity diagram 1000, according to an exemplary, non-limiting aspect of the present invention.

Referring to the exemplary pre-modeling activity diagram 1000, which is illustrated in more detail in FIG. 10, the predefined data templates 1010 (e.g., summary, detail, etc.) can include sets of fixed data structures. The view component 1020 (e.g., which can be embedded in the report templates), can include a JavaServer Pages (JSP) tag library software component, which can include, for example, an Application Programming Interface (API) to register the data template, an API to register the user and user role, an API to register the filter information, an API to register Data warehouse related information, a function to form Structured Query Language (SQL) for data extraction by role and filter, and a function to return either the Query or Data template instance to Report, etc. The predefined sample report templates 1030 can includes sets of readily available report templates incorporating framework components. The user interface (UI) designer/modeler defined report templates 1040 can include application specific custom report templates, which can be defined by an appropriate role player (e.g., administrator). The user can chose the data template and embed view components to use the framework.

Turning again to the exemplary high-level end-to-end dashboard component flow diagram 300, as illustrated in FIG. 3, the present invention can provide an observation model data warehouse model 325, a dashboard model 330, a dashboard meta-model 335, and a deployment code 340.

Figure 11:
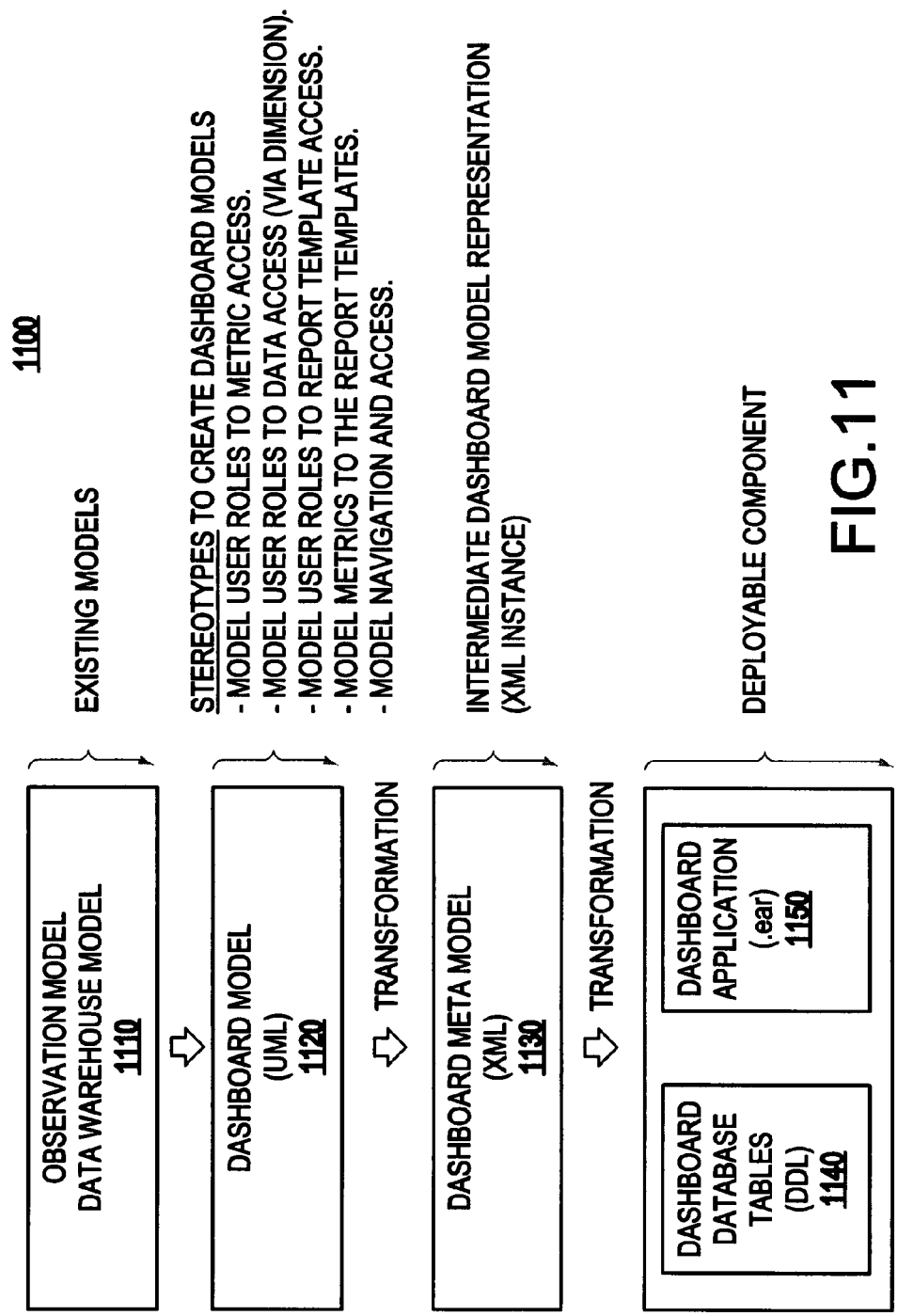
FIG. 11 illustrates an exemplary modeling activity flow chart 1100, according to an exemplary, non-limiting aspect of the present invention.

With reference to the exemplary modeling activity flow chart 1100 in FIG. 11, the observation model data warehouse model 1110 can include, for example, existing models. The dashboard model (UML) 1120 can include stereotypes to create dashboard models, such as Model User Roles to Metric Access, Model User Roles to Data Access (via dimension), Model User Roles to Report Template Access, Model Metrics to the Report Templates, Model Navigation and Access, etc. The dashboard models can be transformed into dashboard meta model (XML) 1130 (e.g., an intermediate dashboard model representation (XML instance)).

The dashboard meta-model (XML) 1130 can be transformed into deployable components, such as dashboard databases tables (Data Definition Language (DDL)) 1140, dashboard application 1150 (e.g., EAR file *.ear), etc.

Turning again to the exemplary high-level end-to-end dashboard component flow diagram 300, as illustrated in FIG. 3, the present invention can provide deployable dashboard components 345, users to data mapping 350 (e.g., to define access control). The deployable dashboard components 345 can capture data from the data warehouse 360 to generate view dashboard reports 370.

Figure 12:
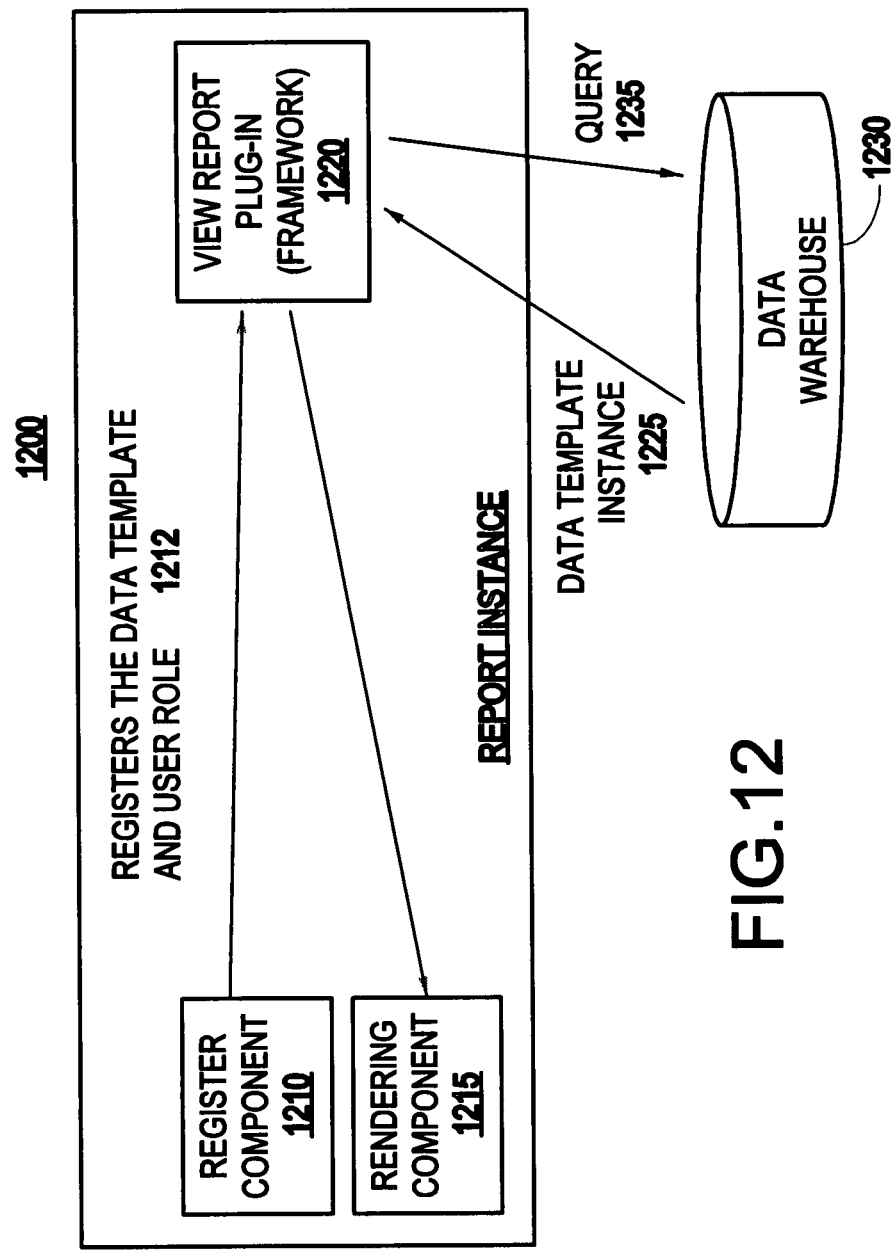
FIG. 12 illustrates an exemplary report template execution scenario 1200, according to an exemplary, non-limiting aspect of the present invention.

FIG. 12 illustrates an exemplary report template execution scenario 1200, according to the present invention. As illustrated in FIG. 12, the present invention can provide a report instance including a view report plug-in (framework) 1220, a rendering component 1215, and a register component 1210, which can register the data template and user role (e.g., 1212). The view report plug-in can query 1235 the data warehouse 1230, which can provide a data template instance 1225 to the view report plug-in 1220.

Figure 13:
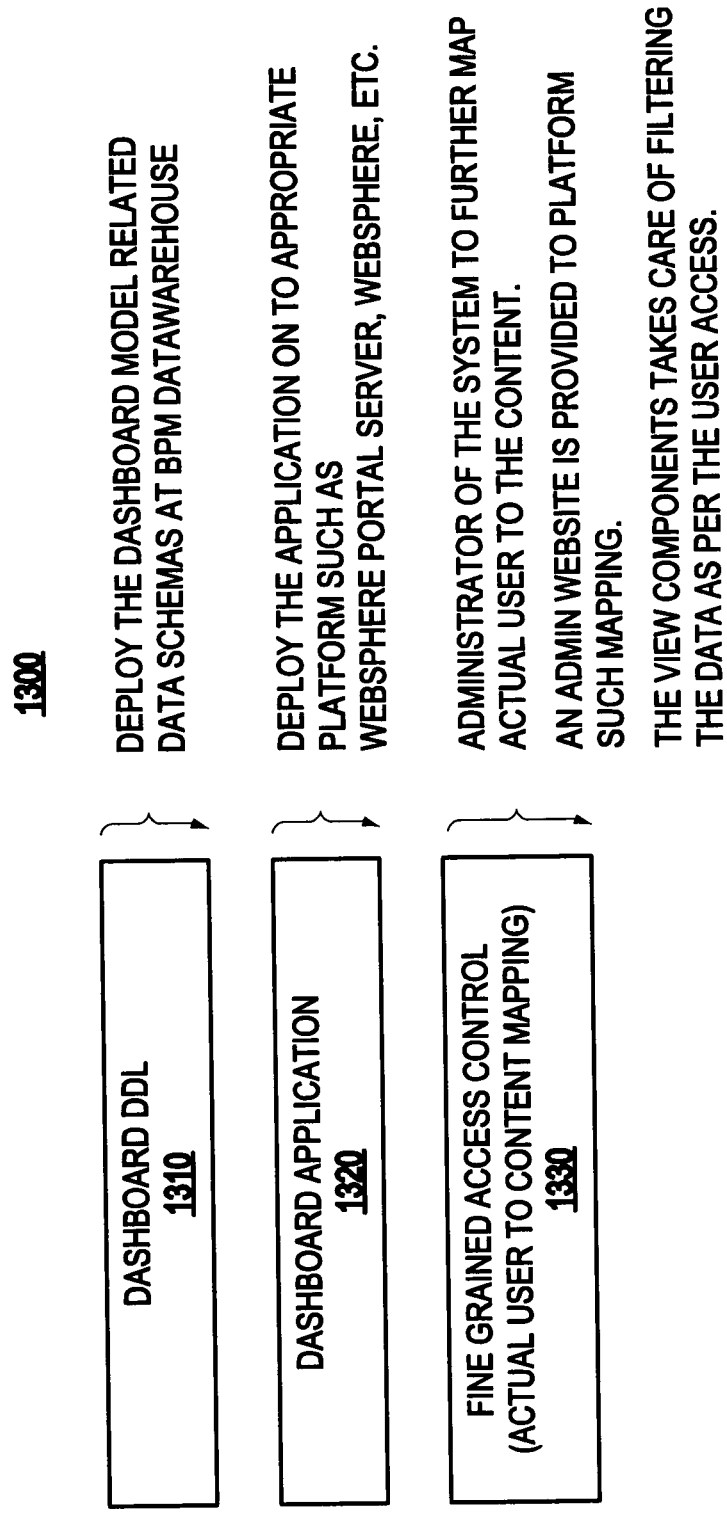
FIG. 13 illustrates an exemplary post-modeling activity diagram 1300, according to an exemplary, non-limiting aspect of the present invention.
Figure 14:
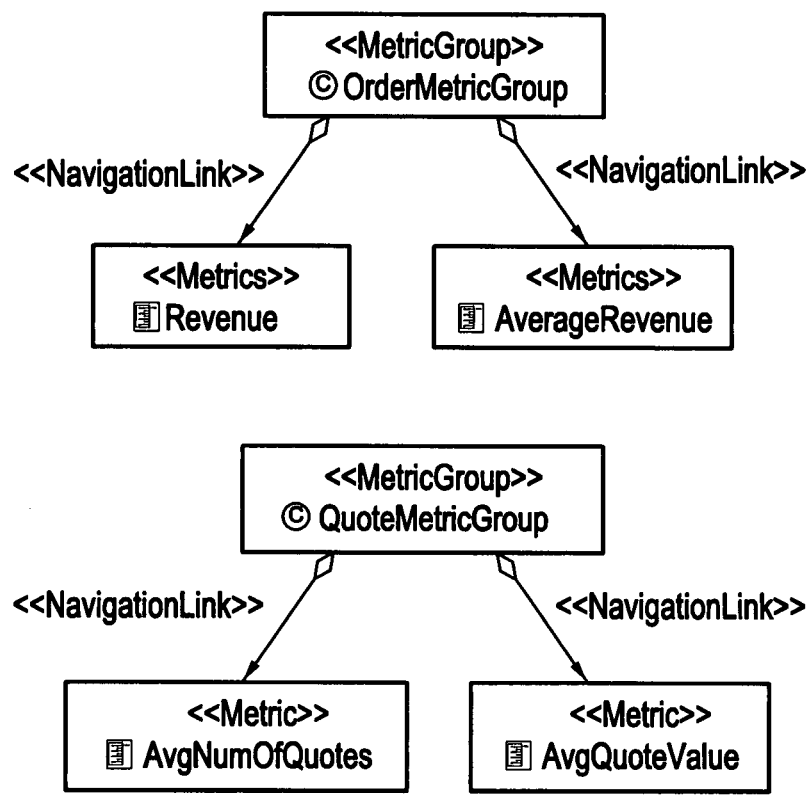
FIG. 14 illustrates an exemplary metric groups definition model 1400, according to an exemplary, non-limiting aspect of the present invention.

FIG. 13 illustrates an exemplary post-modeling activity diagram 1300, according to the present invention. As shown in FIG. 13, the dashboard (DDL) 1310 can deploy the dashboard model related data schemas at the business performance management (BPM) data warehouse. The dashboard application 1320 can deploy the application onto an appropriate platform, such as WebSphere Portal Server, WebSphere, etc. The fine grained access control 1330 (e.g., which can define actual user to content mapping) can be used by an administrator of the system to further map an actual user, or a plurality of actual users, to the content. An administrative website can be provided to perform such mapping. According to the present invention, the view component can take care of filtering the data, as per the user access.

The above exemplary features of the present invention are described in more detail below.

The inventors have recognized that, while there is a significant research effort towards these directions, the conventional systems and methods, to date, have focused on the problem of how to effectively model a business process, but have not addresses the problem of modeling the entire business performance monitoring process, from the source data to the dashboard (i.e., the user interface for the monitored metrics).

The present invention provides an approach for dashboard development that is model-driven and can be integrated with the business performance models. The present invention adopts the business performance modeling framework, and extends it in order to capture the reporting aspects of the business operation. The present invention can provide models that can effectively represent all the elements necessary for the business performance reporting process, and the interactions among them. The present invention can demonstrate how all these models can be combined and automatically generate the final solution.

The present invention can provide dashboard development that can be fast and easy, while maintaining flexibility in the design, and without sacrificing versatility or performance. The framework for dashboard design that is model-driven. The framework, according to the present invention, can include a number of user-customizable models that can effectively capture the functionality of a dashboard. The present invention can provide different models for modeling the data, the users and their data access privileges, and the navigation among the various data views.

Once the user has designed the dashboard with the desired functionality using the provided models, the exemplary framework, according to the present invention, can automatically generate code for the deployment of the dashboard, leaving only minor customization issues for the developer. The generated code can cover all the aspects of the dashboard, such as:

Management of the data to be displayed, involving the creation of relevant databases and access to them.
Design of different views of the data, and of the navigation among those views.
Assignment of access privileges to the users of the dashboard, so that each user can only access the data and views that are relevant.

The present invention can permit the developer to focus on the dashboard functionality, and can relieve the developer from the burden of the user interface development experience. The benefits of such a model-driven dashboard development, according to the present invention, can include the graphical representation and easy manipulation of the solution, the error free code generation, and the ability to capture the business reporting requirement quickly and cost effectively. The conventional systems and methods have not recognized such an approach for model-driven dashboard design.

Thus, the present invention can describe a framework for model-driven dashboard design. The models employed by the present invention can cover the many facets of this process, such as the data to be displayed, the users of the system, the roles and access privileges of each user, the content of each dashboard page view, and the navigation among those views.

The method, according to the present invention, is complementary to business process and business performance modeling, and leverages from such models. The present invention describes how such a novel approach can interact with a specific business performance modeling approach, namely, BPM.

Nevertheless, the ordinarily skilled artisan would recognize that the present invention is not customized for BPM, and can operate in conjunction with any other business process model as well.

The framework, according to the present invention, can enable the automated generation of all the code necessary for the deployment of the dashboard. Therefore, the burden of tedious programming from the dashboard development team can be reduced or eliminated, and the time required for delivering the solution can be greatly reduced.

The approach of the present invention can be validated using real-world scenarios. The application of the proposed method to a real problem, and demonstration of the benefits of the present invention with regards to development time and flexibility of the solution, will be described below.

As described above, there is a growing trend in using model-driven methodologies for developing large system software, due to their high level abstraction and code re-use (or regeneration). They have been widely applied in related areas, such as software reuse, reverse engineering, and user interface design. The benefits of adopting model-driven design include reduced software development time, enhanced code quality, and improved code maintenance.

There are also numerous related works about business processes. Widely considered as an extension of a workflow management system, business process management enables the management and analysis of operational business processes. Recent work has focused on modeling business processes, consistency checking for model integration, and composing Web services and business processes via the model-driven approach.

Business processes can be implemented, for example, using a workflow or a state machine model. The workflow model is a natural representation for a business process model, modeling the sequence of tasks corresponding to the business operation. There can also be control logic and data transformations between tasks. Business Process Execution Language (BPEL) defines a program understandable language to represent such a process for web service environments. Yet, BPEL can only orchestrate the flow execution;

business data are still not synchronized, correlated, or linked together for the auditing and analysis purposes.

An approach that tries to overcome the above shortcomings is the Model-Driven Business Transformation (MDBT). MDBT models business operations from the point of view of a business analyst, without regard to existing or planned information technology solutions. In other words, an MDBT operation model is a truly Computation Independent Model as described by Object Management Group (OMG). The first step in creating an operation model is to identify the primary business artifacts that an enterprise must create and process to conduct its business. The operations can then be described by the set of tasks that must be performed to process those artifacts, and the roles assigned to the tasks. In our experience, such operation models combine artifact lifecycles and data in a way that is more meaningful to business analysts. As described below, MDBT can include a path to implementation of the operation model.

There is also much interest around the concept of dashboards, with several conventional solutions. For example, conventional dashboard applications have been specifically designed for doing some analytics and for visualizing data. Nevertheless, these conventional approaches do not integrate with the business process and business performance models. Therefore, the conventional approaches require much effort to develop and maintain.

In contrast, the present invention provides a novel method for dashboard design that is model-driven. The high-level models defined by the present invention can be integrated seamlessly with business performance models, leveraging the common parts of the design, and enabling an end-to-end design process.

In addition to espousing a business artifact-centric approach to operation modeling, MDBT offers a model-driven development toolkit and technique. The tools automatically transform an operation model into a platform-independent solution composition model in UML2. In this stage of modeling, the solution architect can fill in much of the IT detail that is outside the domain of the business analyst. These details can include integration with external services, as well as role players. At each stage in the lifecycle of the business artifacts, now represented as a state machine, the architect specifies what portion of the data associated with the artifact will be available to the relevant role players and services. Following the completion of the solution composition model, MDBT code generation tools can automatically create Java 2 Platform, Enterprise Edition (J2EE) components that manage the process and provide a simple user interface by which users can interact with the solution. The automated transformations and code generation can enable rapid prototyping, greatly accelerating the development cycle, and allowing for a fast turnaround iterative development regimen.

The solution composition model also can provide a platform on which an observation model can be constructed. The elements of the observation model (e.g., events) can be linked to those of the solution composition model (e.g. states and transitions) so as to define how the performance metrics will be gathered.

Business Performance Management (BPM) can be an effective means of monitoring business processes. Model-based BPM normally includes an observation model that conforms to a pre-defined meta-model, such as the one provided by MDBT, which we discussed above. Entities such as input events, metrics, outbound events, situation detectors, and actions can be monitored and scheduled through the observation model. Using BPM, the present invention can detect bottlenecks of business operations in real-time or analyze them at a pre-determined schedule, and identify anomalies by correlating event sequences. Based on the observation model, actions triggered by the above situations can involve sending out email alerts or displaying statistics and aggregated information onto a dashboard.

The present inventors implemented a BPM solution based on the model-driven development methodology. There are two exemplary approaches that were adopted for representing a BPM solution.

The first approach utilizes the Unified Modeling Language (UML) with UML2 profile extension. With a convenient graphic user interface (GUI) tool, BPM entities and relationships can be defined using UML models. The second approach utilizes XML schemas for defining BPM entities and the relationships between the entities. Both approaches can be implemented as plug-ins on Rational Software Architecture (RSA).

Although the exemplary aspects of the present invention are described under the general framework of MDBT and BPM, the ordinarily skilled artisan would know and understand that the present invention is not limited to this framework. As described in more detail below, an XML interface, for example, can be used to allow the present invention to operate with any other business process modeling frameworks.

Referring now to the drawings, and more particularly to FIGS. 1-23, there are shown exemplary aspects of the method and structures according to the present invention.

Model-driven Dashboard Framework

With reference to FIG. 1, an exemplary high-level architecture 100 for a model-driven dashboard framework 155 will be described below. Model-driven dashboards aim at automating the reporting capabilities related to business monitoring. Therefore, they have the potential to bridge the gap between BPM models that specify the elements of a dashboard, and dashboard development, which is conventionally a manual effort (i.e., manually performed).

FIG. 1 exemplary illustrates a high level architecture 100 of the proposed dashboard framework 155. As mentioned earlier, the framework 155 extends the existing BPM model in order to support the dashboard reporting needs.

Specifically, the present invention extends the BPM Observation Model (OM), one of the Unified Modeling Language (UML) Models of MDBT Toolkit that captures the monitoring and alerting requirements of an enterprise. In order to visually represent these requirements as models, the OM makes use of the UML2 profiles to extend the base UML elements. The Dashboard Model employs similar techniques to represent its modeling elements, so that the solution designer can work with consistent models for the entire, end-to-end solution design. The exemplary models can capture aspects of the BPM Dashboard. For example, the model can capture a definition of metrics and related context information to be displayed on the dashboard, organization of information into pages, and definition of navigation paths among these pages, and assignment of access control privileges to the dashboard information, depending on the user roles.

The ordinarily skilled artisan would know and understand that the present invention is not limited to representing the dashboard modeling artifacts using UML 2, and that the present invention can represent the dashboard modeling artifacts using other tools and techniques other than UML 2.

The present invention can use popular modeling tools, such as Rational Software Architect (RSA), for capturing the UML representation of the dashboard models. The ordinarily skilled artisan would know and understand that RSA can be interchanged with any other editor supporting the UML 2 notations, within the spirit and scope of the present invention.

Turning again to FIG. 1, the exemplary dashboard framework 155 can include a dashboard model editor 130, which can receive inputs from a report template storage unit 120 and a model storage unit 125. Business models 105, such as business performance management BPM 115, as well as other business models 110, can be input into the dashboard model editor 130.

For illustrative purposes, the present invention uses UML for all the modeling requirements in the exemplary framework. However, the present invention also can provide an equivalent XML representation, which serves as the exemplary meta-model. In fact, the representation that the exemplary approach uses internally is the XML representation. FIG. 2 illustrates an exemplary Business Performance Management (BPM) dashboard meta-model (XML schema) definition 200, according to an exemplary, non-limiting aspect of the present invention. The transformation between the UML and the XML representations is lossless, in the sense that all the modeling elements and the relationships among them are preserved.

By providing the Dashboard XML Meta-Model as an additional level of abstraction, the present invention can decouple the dashboard modeling process from the modeling of the rest of the business processes. Therefore, changes in the OM can be prevented from affecting the Dashboard Framework 155. Moreover, the present invention can replace the OM with any other business modeling approach (e.g., 110), without affecting the dashboard model (e.g., external modeling 140).

When the dashboard model (e.g., 130) has been transformed into the dashboard meta-model representation (e.g., 145), the present invention can feed this representation to the dashboard code generator 150, which subsequently can produce the deployable dashboard application 160. The generated application can consist of the dashboard Application, which is the set of files that contain the actual code for the application, and the dashboard DDL, which is the set of files that generate the auxiliary structures needed by the application, such as database tables. These tables can be created in the BPM data warehouse.

The dashboard application can be readily deployed on a J2EE application server. The particular choice of the application server is orthogonal to the solution of the present invention. It is noted that the exemplary code generator 150, according to the present invention, can be modified to generate deployable components for any application server.

FIG. 3 exemplarily illustrates an overview of a high-level end-to-end dashboard-design process 300, according to the present invention.

For example, the present invention can begin by defining custom reports (e.g., 320) to be used by the dashboard, or by simply selecting some of the predefined reports from the template data store 305. The present invention can define plug-in components for report templates 310. A template store 315 can be provided.

As will be discussed below, the role of these report templates 305 is to retrieve the appropriate data and handle the presentation of these data on the screen. Then, the solution designer can model the dashboard elements using the Model Editor 130, transform the result into the Dashboard Meta-Model representation 145, and invoke the Code Generator 150 to generate the deployable software components (e.g., 160). Once deployed, the Dashboard can be accessed using a web browser. The aspects of exemplary Dashboard Model elements are discussed below.

Dashboard Model Artifacts

The dashboard model artifacts, according to the present invention, can be classified, for example, into three categories. A first category can be related to modeling the data that are necessary for the dashboard and can include data and metric models. A second category can correspond to an abstract presentation layer, including navigation and report template models. Finally, a third category can be related to user roles and data access privileges, and can include models that define the dashboard access control, by relating user roles to data elements, as well as elements in the presentation layer.

Dashboard Model Definition

As discussed above, the present invention exemplarily uses UML for the entire dashboard modeling requirements because it is widely accepted in the industry, and also because it provides to the solution developer a consistent platform to work with, across the various MDBT models.

The ordinarily skilled artisan would know and understand that the present invention is not limited to representing the dashboard modeling requirements using UML, and that the present invention can represent the dashboard modeling requirements using other tools and techniques other than UML.

The present invention can extend the UML meta-classes and relationships by introducing new stereotypes using UML 2 profiles to model the dashboard elements. These stereotypes can then be stored as part of an existing BPM model profile. When modeling an actual solution using a modeling editor, these profiles can be applied in order to take advantage of the BPM Dashboard Model elements.

Dashboard Data Model

With reference again to FIG. 3, in an exemplary aspect of the present invention, it can be assumed that all the necessary data can be stored in a data warehouse 360, using a star schema. Therefore, the present invention can use the metric group model artifact definition 400, as exemplary illustrated in FIG. 4, where each data element is marked as either a dimension, or a metric. Even though the data model supported by the present invention is simple, its semantics are rich enough to be able to model many real-life scenarios. This is because it is usual for real world data-modeling problems (especially the ones that are being targeted by the present invention) to have a natural star-like representation. An example scenario may be product sale information, where the metrics can include number of units sold and revenue, and the dimensions can include geographies and time.

Figure 4:
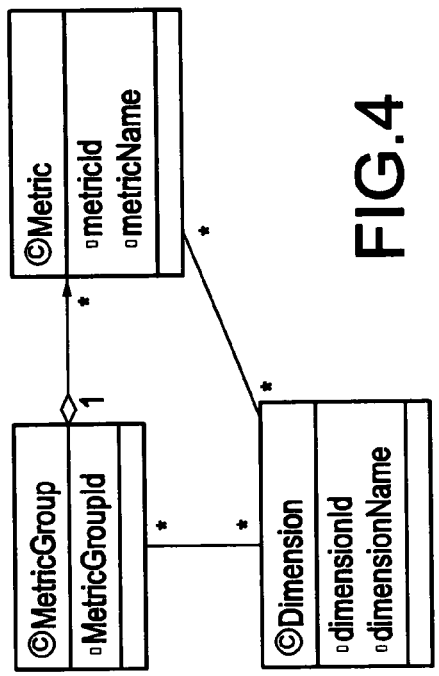
FIG. 4 illustrates an exemplary dashboard metric (KPI) group model artifact definition 400, according to an exemplary, non-limiting aspect of the present invention.

In FIG. 4, the present invention introduces a Metric Group modeling element, which can be used for grouping of relevant metrics. Such a grouping may be useful when modeling relationships to other artifacts, where all the members of the Metric Group participate. FIG. 4 exemplarily illustrates the Metric Group UML class that connects to the Metric class in an aggregation relationship.

Dashboard Navigation Model

Figure 5:
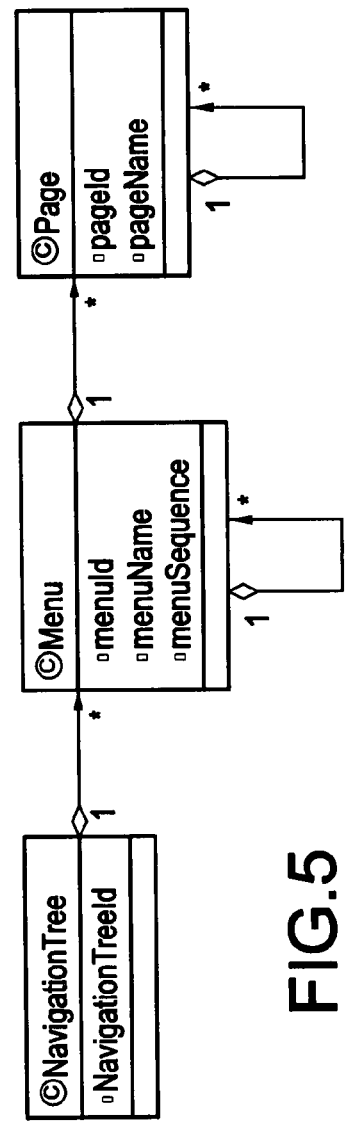
FIG. 5 illustrates an exemplary dashboard navigation model artifact definition 500, according to an exemplary, non-limiting aspect of the present invention.

In FIG. 5, the present invention illustrates exemplary GUI modeling Elements (stereotypes), such as, a Navigation Tree, Page, and Menu classes. These three classes can form the Dashboard Navigation Model. In a typical scenario, the analyst can start by defining some pages, and then associating these pages with menus. In a last step, the analyst can introduce a Navigation Tree element, in order to capture the navigation paths among the pages, which eventually form the Dashboard reports.

Dashboard Report Template Model

Figure 6:
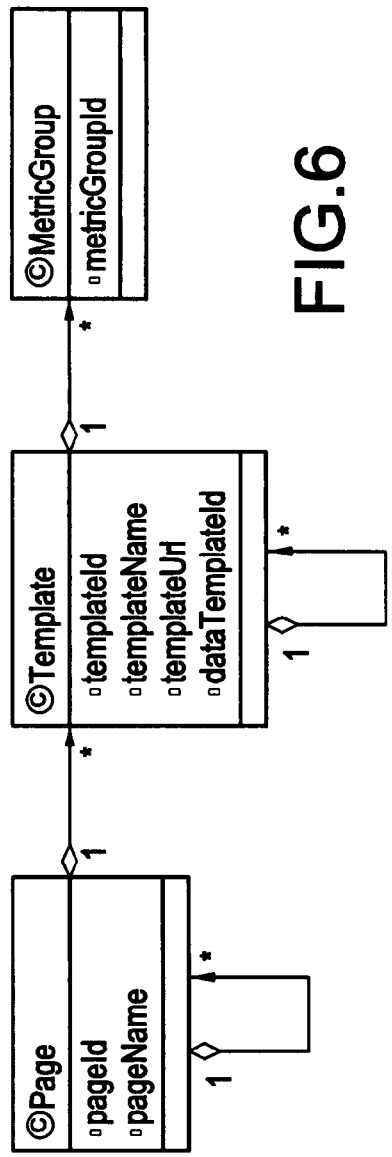
FIG. 6 illustrates an exemplary dashboard report template model artifact definition 600, according to an exemplary, non-limiting aspect of the present invention.

Dashboard report templates can be used to define the information content of individual pages. For example, FIG. 6 illustrates that a Report Template can be associated with a page, and may refer to several Metric Groups. When the page is displayed on the dashboard, the information about all the metrics corresponding to the templates can be rendered on the screen. It is noted that each page can be associated with one or more Report Templates.

The Report Templates also can define the details for the visual presentation of the data they contain. By creating a report template, the user can choose to display a set of metric data as a table, as a chart, or using both display modes.

Dashboard Access Control Model

A dashboard access control model can define all the access control properties relevant to the dashboard. Using the various modeling elements, the present invention can specify for each user role the access privileges to different parts of the data, as well to different pages of the dashboard. Thus, the dashboard users, according to their assigned roles, may only have access to a subset of the dashboard reports.

Figure 7:
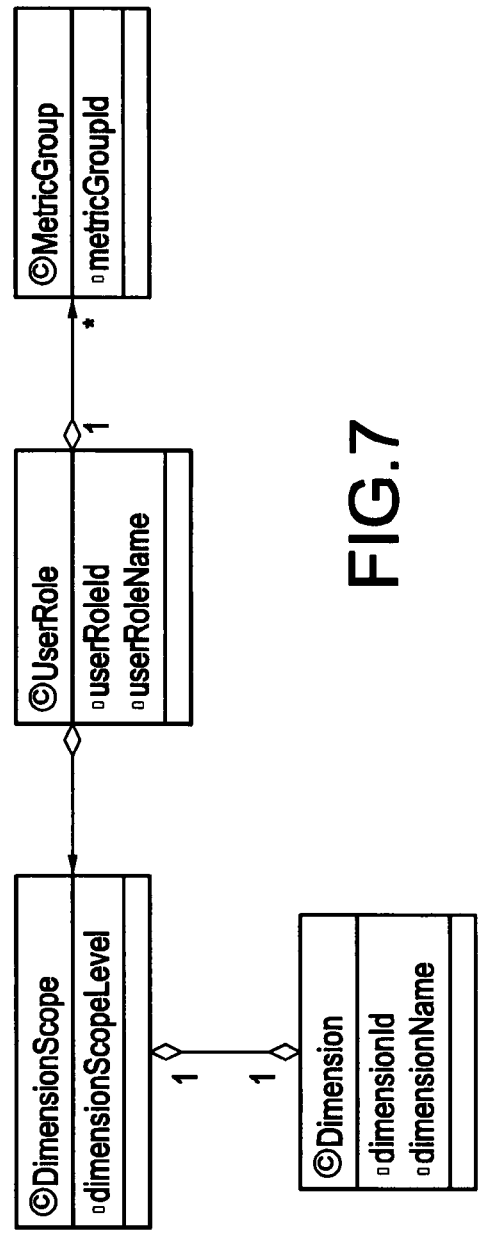
FIG. 7 illustrates an exemplary user role to metric and dimension model artifact definition 700, according to an exemplary, non-limiting aspect of the present invention.

FIG. 7 exemplarily illustrates how the present invention can model the above requirements in the framework. The business analyst can model the access privileges to the reporting data according to User Role (such as manager, data administrator, etc.), and by Metric Group and Dimension.

The relationships between user roles and metrics, and user roles and dimensions will be exemplarily described below.

According to the present invention, a "UserRole-MetricGroup" relationship specifies the access privileges of User Role to Metric Group. When the analyst creates an aggregation link between the above two modeling elements, all the users assigned to User Role gain access to all the metrics described by Metric Group. his lets the model capture the role based access to metrics. At runtime, based on this model, the system can determine what metrics to show on the dashboard based on the User Role (i.e., only those metrics for which the user has access are displayed on the dashboard).

According to the present invention, a "UserRole-DimensionScope" relationship can define the User Role access privileges to various dimensions, as well as to the dimension levels in each dimension. This lets the business analyst define fine grained access control at the metric context.

When the dashboard has been deployed and is ready for use, the administrator can have the ability to further refine the data access control by the specific data values, as will be described below.

Figure 8:
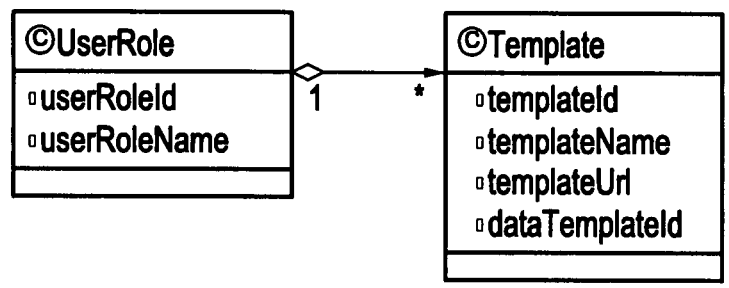
FIG. 8 illustrates an exemplary user role to report template model artifact definition 800, according to an exemplary, non-limiting aspect of the present invention.

An "Access by Report Template" can be another aspect of dashboard-report access-control modeling. A User Role may have access to one or more Report Templates, and the business analyst may select a set of (already defined) templates and associate them to the User Role elements. This lets the dashboard framework filter the templates that are shown to the user of the dashboard. FIG. 8 exemplarily illustrates a "User Role to Report Template" relationship.

Figure 9:
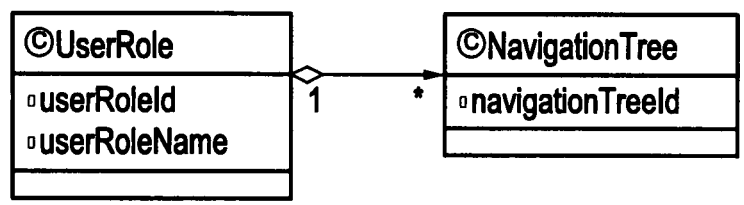
FIG. 9 illustrates an exemplary user role to navigation tree model artifact definition 900, according to an exemplary, non-limiting aspect of the present invention.

The framework, according to the present invention, can permit the business analyst to define access control based on Navigation Trees, as exemplarily illustrated in FIG. 9. It is noted that a single Dashboard Model can involve several Navigation Trees. In this exemplary case, the business analyst may wish to provide different access privileges to each one of the navigation trees, according to User Role.

The foregoing access control models provide a powerful and flexible toolset. Indeed, not only do the foregoing access control models provide coarse- and fine-grain access control to data, but they also allow the business analyst to design a small set of pages, which at run-time, will display different information, according to the access privileges of the user accessing the dashboard.

Dashboard Model Solution Methodology

An exemplary dashboard model solution methodology will now be described. Even though the model-driven approach brings efficiency to BPM solutions development, it can be beneficial to understand and follow a specific methodology that can lead to a successful and efficient solution.

The exemplary dashboard modeling methodology, according to the present invention, can be divided in the following three main activities: 1. Pre-modeling activity; 2. Modeling activity; and 3. Post-modeling activity, each of which will be described below.

Pre-Modeling Activity

Before starting to sketch models in order to capture the dashboard requirements, the business analyst is required to understand the predefined components and templates that are included in the Dashboard Framework tool. These components can aid in quickly and efficiently designing the solution.

FIG. 10 exemplarily illustrates a diagram of components 1000 which may be relevant to this activity. One of the important aspects of the exemplary framework is the predefined data templates (data structures) 1010. Since the data model generally is only comprised of a well-defined, limited set of data elements (that is, metrics and dimensions), the framework can publish predefined sets of data structures as part of the tool. Then, each report template can choose the data structures that are suitable for its reporting purposes.

The framework can provide another software component, e.g., the view component 1020, which is responsible for connecting the data layer with the presentation layer of the dashboard. The view component 1020 can use the data structure and User Role elements to connect to the data sources, and can generate an instance of the data structure, which during runtime is passed to the Report Template instance (discussed below) that finally renders the visual widgets. In order to achieve seamless integration, the view components 1020 may need to be embedded in the Report Templates. In the implementation according to an exemplary aspect of the present invention, the view components can be included as JavaServer Pages (JSP) tag libraries.

The present invention also can provide a set of predefined Report Templates 1030. For example, a table and a chart component can be provided. As exemplarily illustrated in FIG. 10, the framework also can support user-defined Report Templates 1040. A restriction (e.g., the only restriction) may be that the new template supports the data templates in its input.

FIG. 11 exemplarily illustrates the above process of a Report Template execution scenario, according to the present invention. The view component 1020 can expose the appropriate Application Programming Interfaces (API's) to capture the data template id, user id, user role, data filters, data sources, etc.

Modeling Activity

After the custom Report Templates have been defined, the next step can be to model the reporting requirements. During this exemplary step, the user may need to perform the following tasks. First, the user can identify the metrics that will become part of the dashboard views, and create Metric Groups by grouping together similar metrics. Second, the user can create report templates for all the different types of information that are to be displayed on the dashboard. Third, the user can create page elements, and associate them to one or more of the report templates defined earlier. Fourth, the user can create the menu elements for the dashboard portal, and link the menu items with the corresponding pages. Finally, the user can introduce navigation tree elements in order to define the navigation flow of the portal.

The different user roles that need access to the dashboard portal also can be defined. Individual users can be assigned a role by the portal administrator during the portal configuration time.

Each user role can be associated with Metric Groups, Dimensions, Report Templates, and Navigation-Trees, so as to specify the access control privileges.

Once the Dashboard Model is ready, it can be automatically transformed into an intermediate XML meta-model representation, according to the present invention, which can be independent of the tool used to build the Dashboard Model. Subsequently, this model can be processed by the Code Generator that produces all the required deployable software components.

Post-Modeling Activity

FIG. 13 exemplarily illustrates artifacts related to the post-modeling phase. The Code Generator can produce two deployable software components, for example, the Dashboard DDL 1310 and the Dashboard Application 1320.

The Dashboard DDL 1310 can contain the definitions for all the tables that need to be created in the BPM Data Warehouse (e.g., 1230). The Dashboard DDL 1310 also can contain necessary SQL scripts for reading data from and inserting data in those tables.

The Dashboard Application 1320 can be a J2EE application that needs to be deployed on a J2EE Application Server. The Dashboard Application 1320 can contain the web module that consists of the chosen report templates along with other supporting software components provided by the framework.

As another step in the dashboard deployment procedure, the user can define fine-grain data access control 1330, according to specific data values of the warehouse (e.g., 1230). In describing the access control in the dashboard model above, it was described that the model allows access privileges to be defined based on the data dimensions. For example, the present invention can permit a particular user role to roll-up and drilldown on the geography dimension.

Even though the above kind of access control can be very useful, in some cases it may not be enough. For example, consider the situation where two different managers are responsible for the Europe and America geographies. In this case, it may be desirable to restrict the access of each manager to the geography for which she is responsible.

In order to achieve this fine-level access control, the present invention can augment the User Role to Dimension model with special annotations that specify the levels of each dimension that can be accessed by the User Role. Note that the present invention generally does not perform this step of access control during the modeling phase, because it depends on the specific data of the application, which are only available in the warehouse after the application has been deployed.

Exemplary Case Study

In order to assess the feasibility and effectiveness of the present invention, the inventors applied exemplary aspects of the present invention to real-world problems.

In an exemplary case, the objective was to develop a dashboard to support the business operation of the TeleSale Representatives (TSRs) that are responsible for the sales of the entire range of a particular product across the globe.

The TSRs are responsible for the entire life-cycle of a sale. Initially, a customer expresses an interest to buy, to which the TSR responds with a quote. If the customer decides to close the deal, then the quote is turned into an order.

In their day-to-day operations, the TSRs need to have a concise view of their business, so as to plan their actions accordingly. The dashboard, according to the present invention, can be used to display information on both, the quotes and the orders, capturing various metrics related to these activities, such as number of quotes and orders, order channel, revenue, and others. These metrics can be organized according to several dimensions, such as time, geography, product type, customer type, and others. Furthermore, access restrictions can be in place, which limit the views of the data offered to the TSRs and the region managers.

The steps of the exemplary solution development process, using the Dashboard Framework, will be described below.

Dashboard Solution Model

The present invention can be started by presenting the models that were created for the dashboard. Note that for brevity, in all the following diagrams, only part of the models that form the complete solution are depicted.

As mentioned above, the first step can be to identify the Report Templates that are needed. If the existing, predefined templates are not suitable, then custom Report Templates can be defined. For this case study, pre-defined summary templates (e.g., OrderSummaryTemplate), as well as some custom-made templates (e.g., OrderDetailTemplate) were used.

Subsequently, similar metrics were identified and grouped together as MetricGroups. As exemplarily illustrated in FIG. 14, revenue and average revenue for orders can be grouped into OrderMetricGroup, while average number of quotes and average quote value can be grouped into QuoteMetricGroup.

Figure 15:
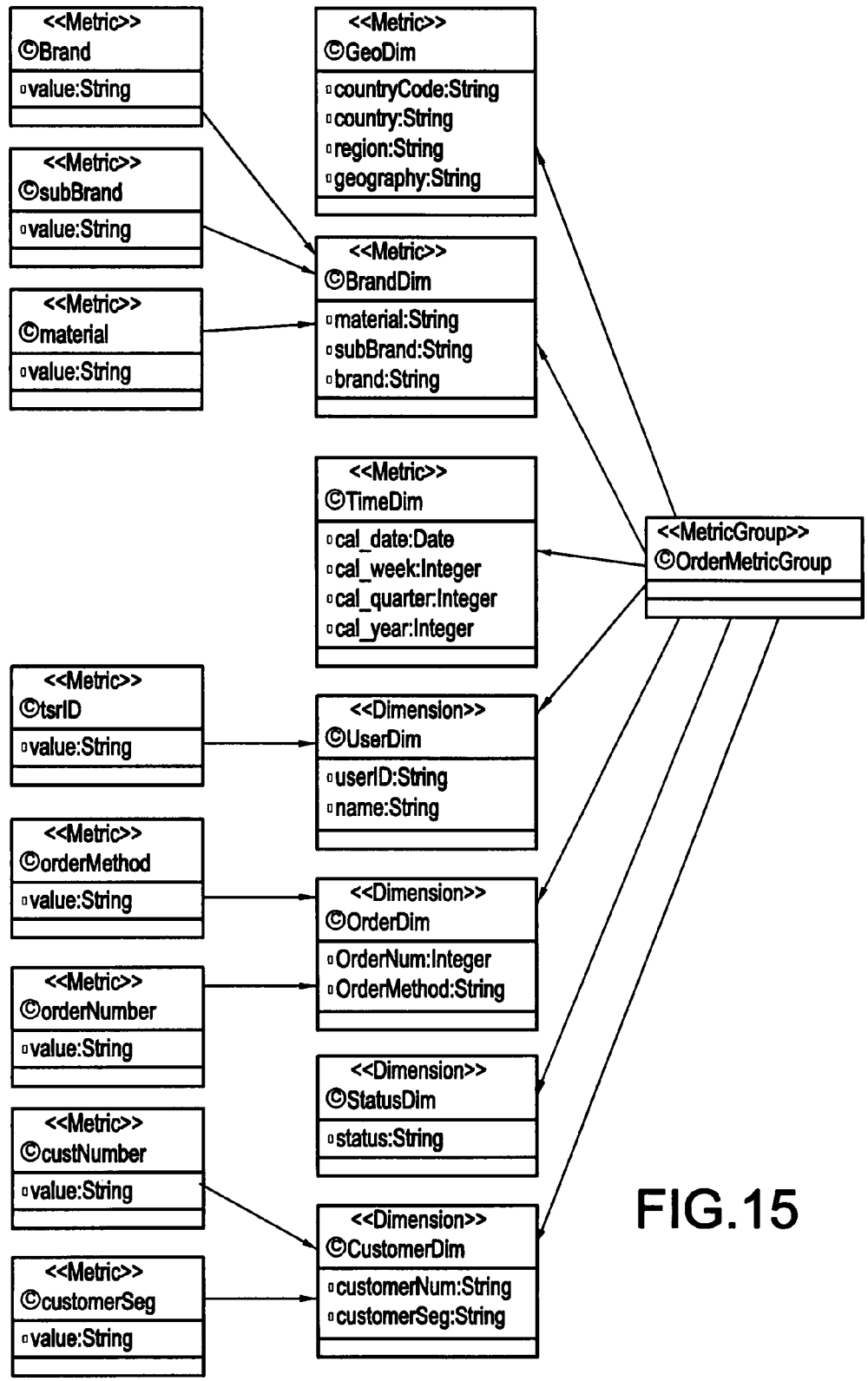
FIG. 15 illustrates an exemplary data model 1500, according to an exemplary, non-limiting aspect of the present invention.

The relationships among metrics and dimensions can be captured by a data model, as exemplarily illustrated in FIG. 15. This diagram can contain relationships that connect dimensions to metrics, as well as metric groups. The latter case can be translated as a relationship between the dimension and each one of the metrics under the Metric Group. A link between a metric and a dimension generally means that the metric can be aggregated along this dimension.

Figure 16:
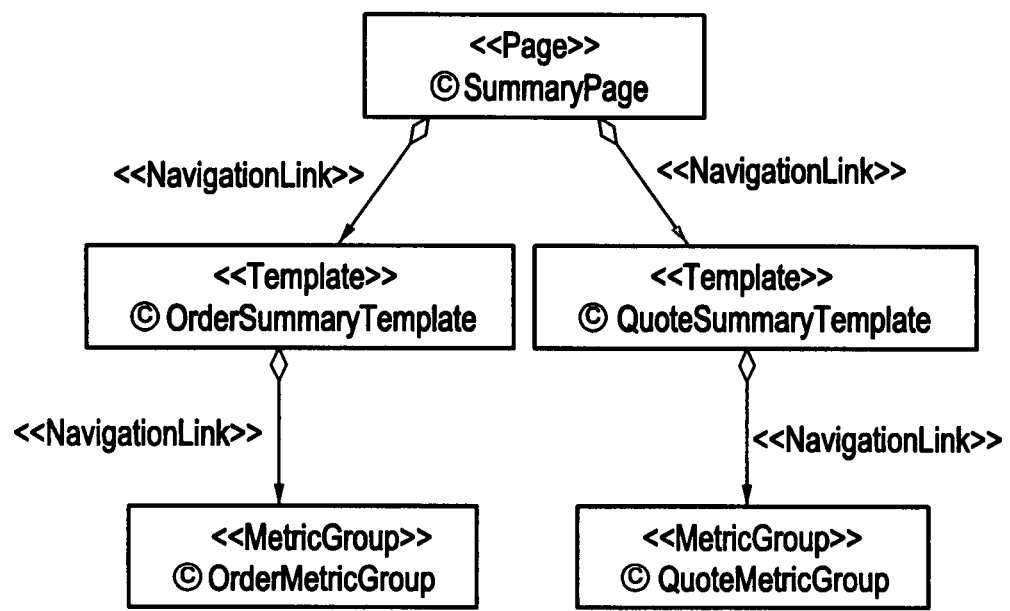
FIG. 16 illustrates an exemplary report template model 1600, according to an exemplary, non-limiting aspect of the present invention.
Figure 17:
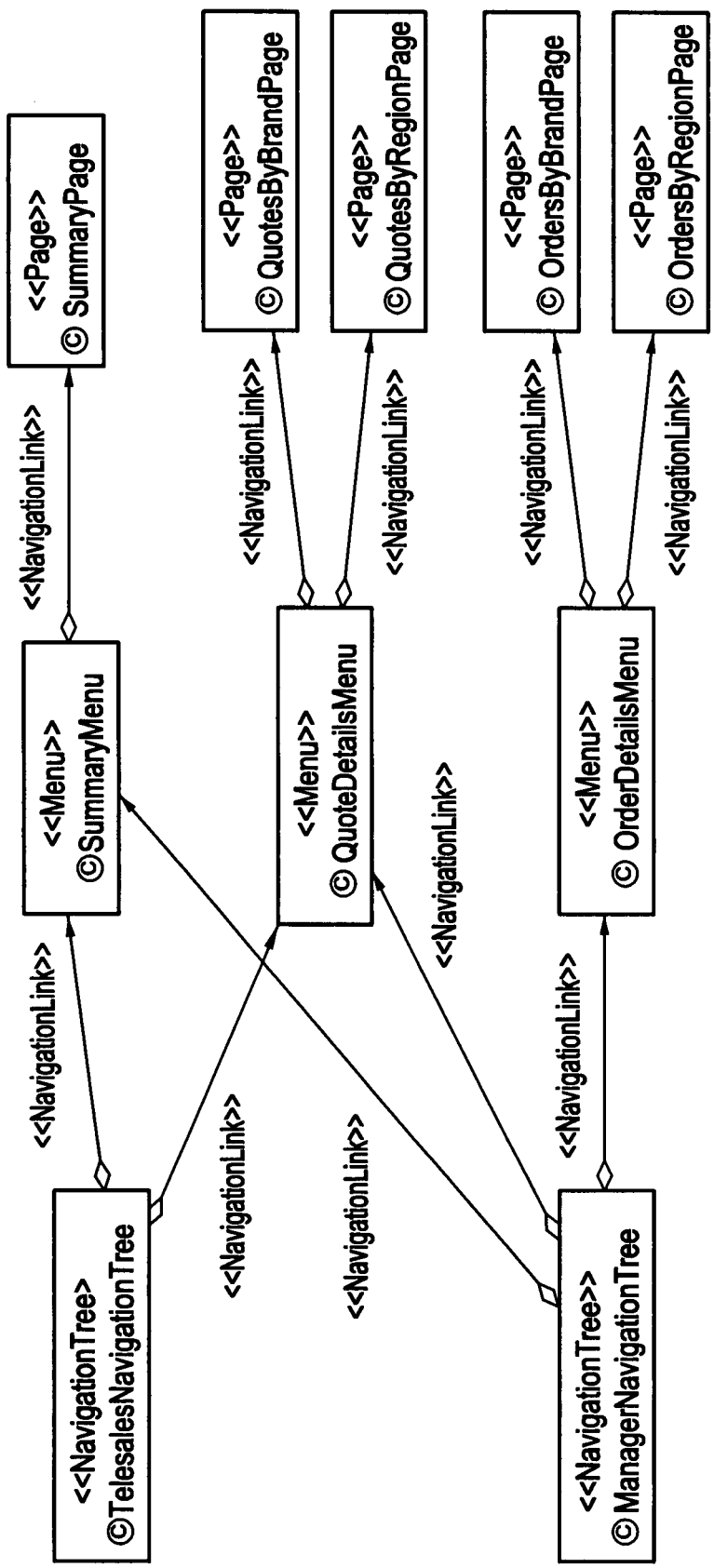
FIG. 17 illustrates an exemplary navigation tree model 1700, according to an exemplary, non-limiting aspect of the present invention.

In order to organize the information into different views (or pages), the present invention can use the Report Template model. FIG. 16 exemplarily shows this model for a summary view, which can display data relevant to orders and quotes. More specifically, this summary page can contain data for orders revenue and average revenue (represented by OrderMetricGroup), and average number and value of quotes (represented by QuoteMetricGroup).

Once all of the pages and menus that are going to be used in the dashboard are defined, the present invention can proceed to model the Navigation Trees. The Navigation Trees can represent the paths that the dashboard user can follow when navigating from page to page. As FIG. 17 exemplarily illustrates, the present invention can define several Navigation Trees, and each page can belong to more than one Navigation Tree.

Figure 18:
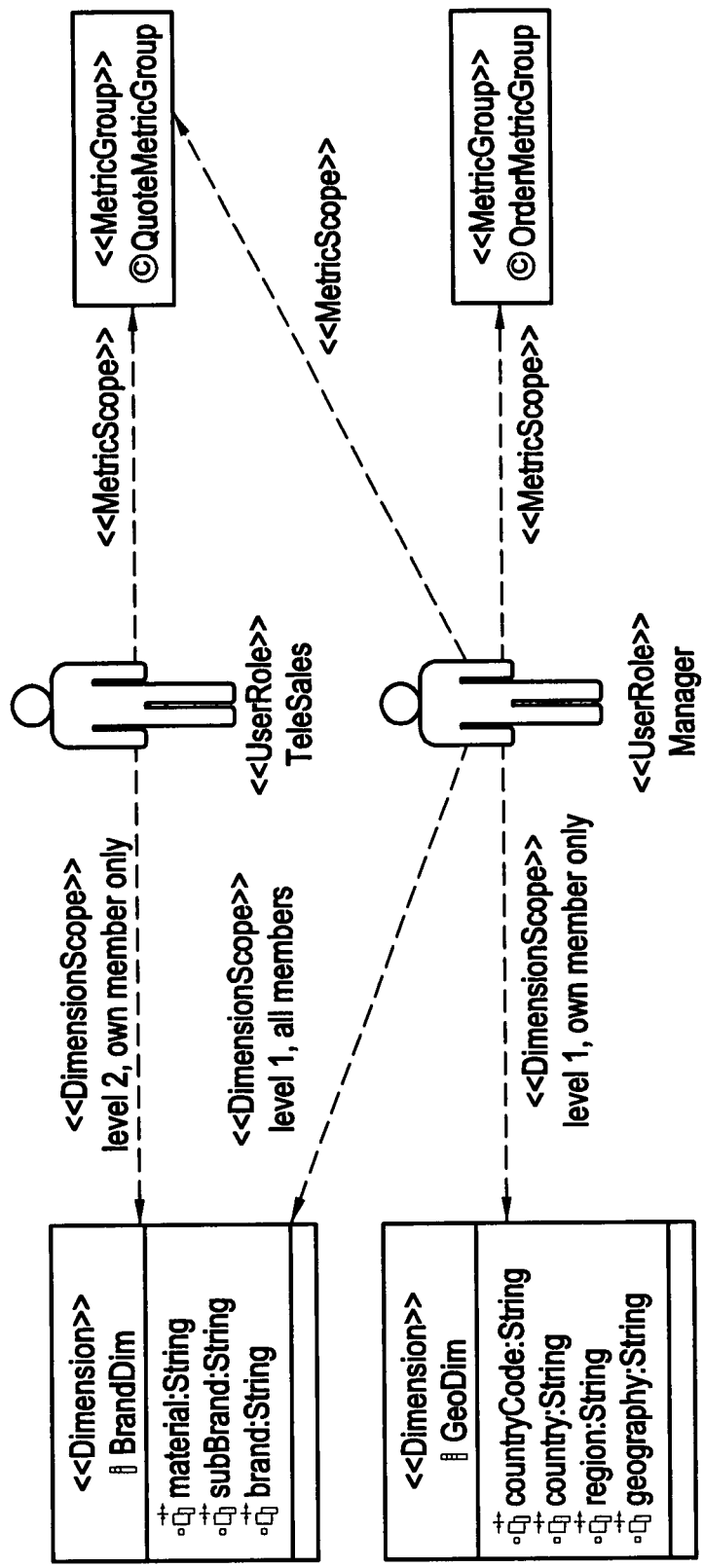
FIG. 18 illustrates an exemplary role to data access mapping model 1800, according to an exemplary, non-limiting aspect of the present invention.

Subsequently, the present invention can define all the data access privileges for the dashboard. FIG. 18 can depict the assigned privileges for the Telesales and Manager user roles, with respect to metrics and dimensions. The model that is created can allow Telesales users to access quote metrics and aggregate them along the brand dimension. In addition to the above, Manager users can also access order metrics and aggregate these metrics along the geography dimension.

FIG. 18 also illustrates how the present invention can model fine-grain data access control using the dimension levels. In this example, the present invention can limit the access on the Brand and Geography data. In this example, a Telesales user can only be able to aggregate data up to the sub brand level (i.e., level 2) in the Brand dimension hierarchy. (The "own member" annotation only instructs the tool that fine-grain access control is required to be applied.)

Figure 19:
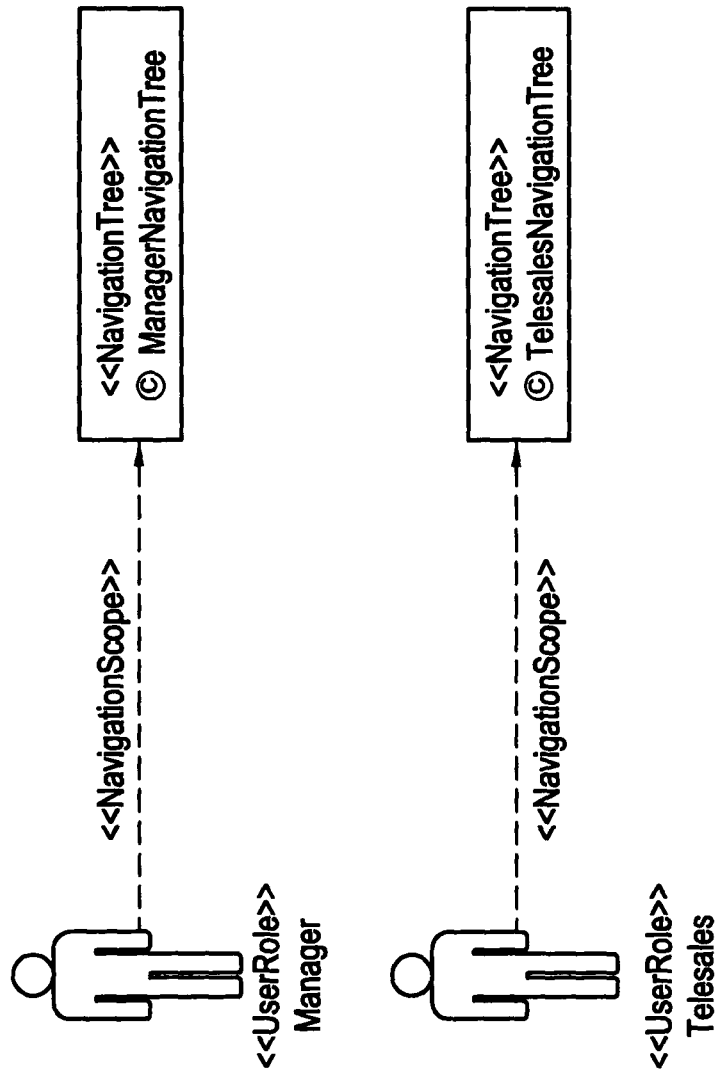
FIG. 19 illustrates an exemplary role to navigation tree access mapping model 1900, according to an exemplary, non-limiting aspect of the present invention.
Figure 20:
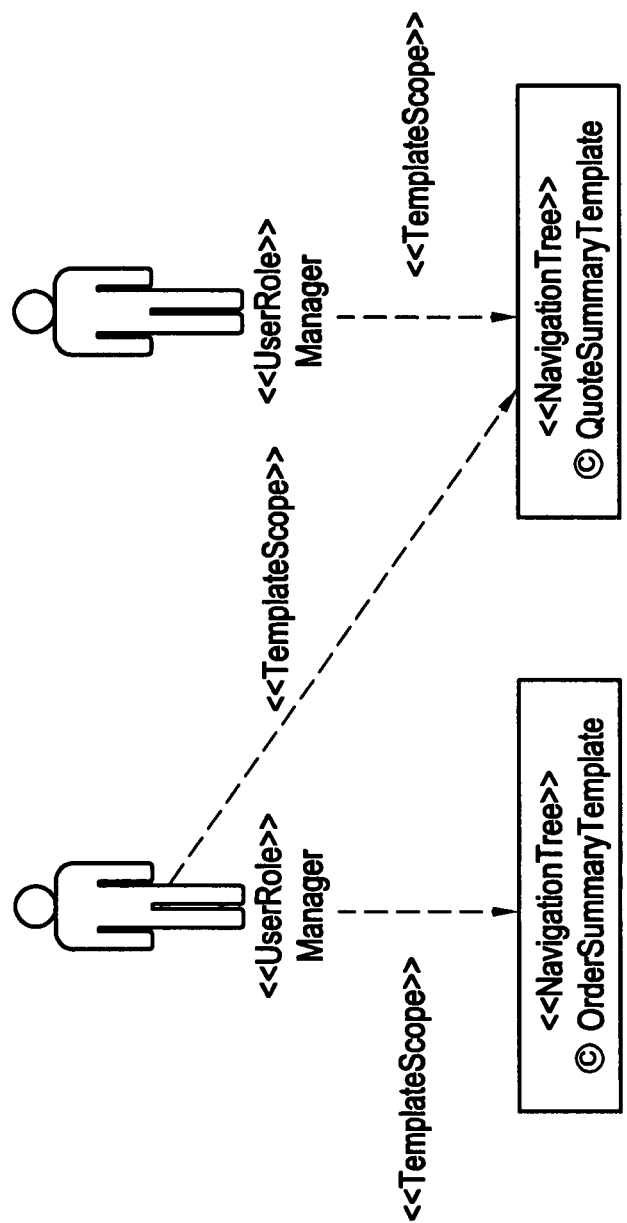
FIG. 20 illustrates an exemplary role to report template access mapping model 2000, according to an exemplary, non-limiting aspect of the present invention.

FIG. 19 and FIG. 20 exemplarily illustrate the User Role access privileges in terms of Navigation Trees and Report Templates, respectively. For the exemplary dashboard, it can be specified that Telesales and Manager users access different Navigation Trees, which translates to a different experience, both visually and content-wise. It also can be specified that Manager users can access the summary templates for the orders and the quotes, while Telesales users only have access to the quote summary template.

When the modeling phase is completed, the present invention can initiate the deployment of the different software components, as described below.

Dashboard Deployment

There can be, for example, two deployable components generated as a result of the modeling activity. The Dashboard DDL component can be the data warehouse schema script that supports the dashboard functionality. This schema can store and manage all of the information relating to metrics, and maintain the fine grained access control to this information by user role.

The Dashboard Application component can be an Enterprise Application that can be deployed on a J2EE application server, and can subsequently be accessed using a web browser.

In the exemplary implementation according to the present invention, the generated application can be deployed on WebSphere Portal Server, and can use conventional commercial data visualization tools for rendering the reports (the framework provides a tag-library or equivalent software component that allows the report template to connect to various commercial data visualization tools.

Figure 21:
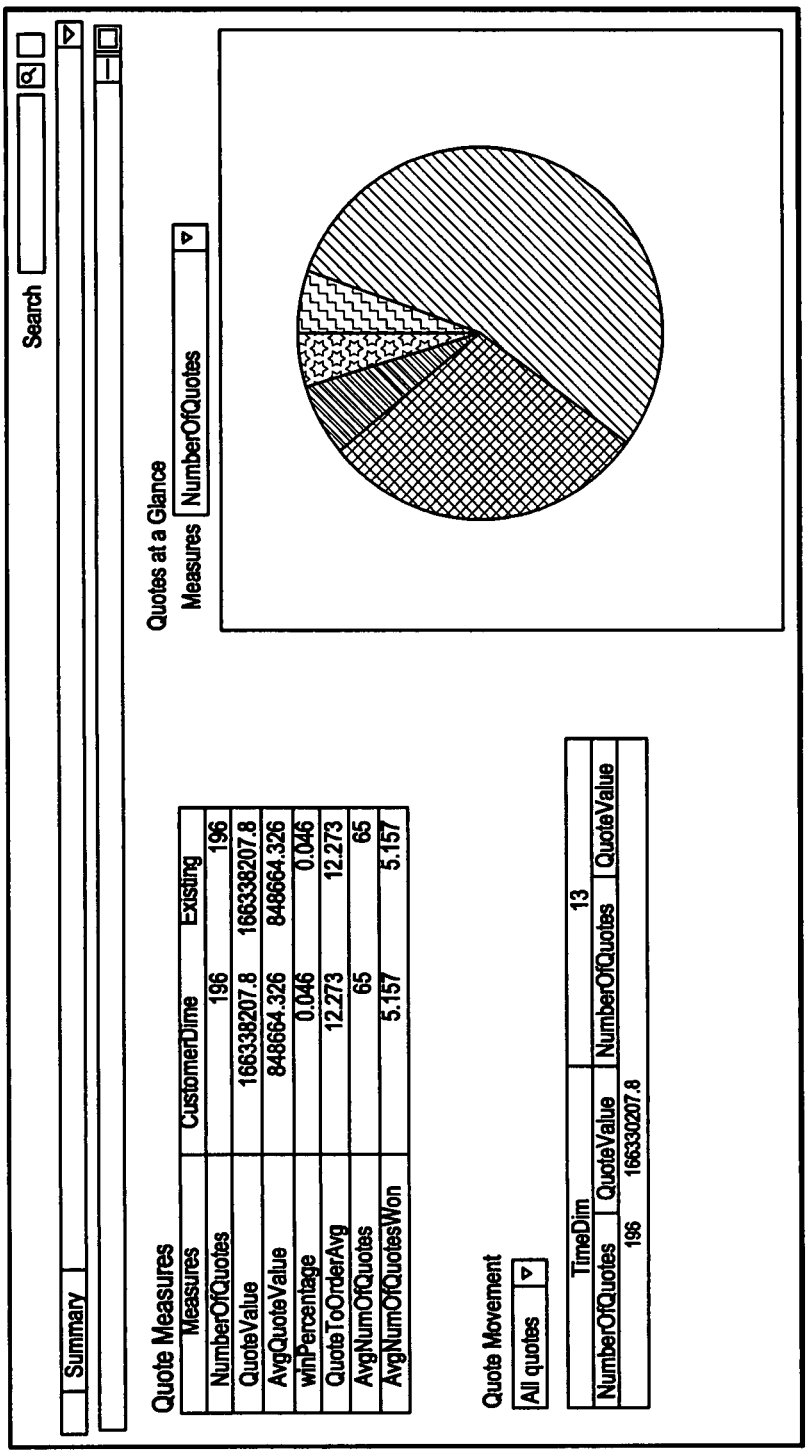
FIG. 21 illustrates an exemplary generated dashboard page 2100, according to an exemplary, non-limiting aspect of the present invention.

In FIG. 21, a screen-capture from the deployed dashboard application, according to the present invention, is exemplarily illustrated. This example illustrates a page that uses tables to display two different types of data regarding quotes (left side of the picture), and a graph to visualize these data (right side of the picture).

According to the exemplary aspects of the present invention, the model-driven approach for dashboard development can provide significant savings in terms of time and cost. For example, a project that may normally require more than three months, may be completed, for example, in just three weeks using the proposed framework, according to the present invention.

In addition, the dashboard developers do not need to have any in-depth knowledge of databases and data warehouses, or access control mechanisms. All these aspects of the dashboard generally can be completely hidden from the developer, and managed by the proposed framework.

Figure 23:
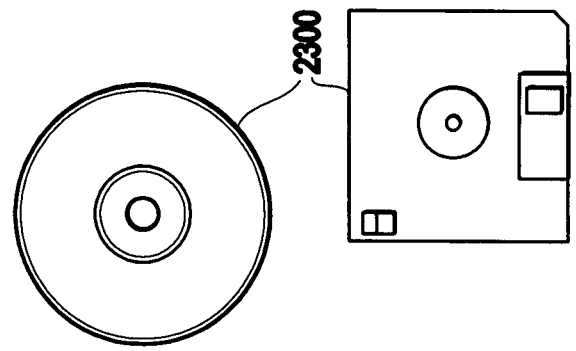
FIG. 23 illustrates a computer-readable medium (e.g., storage medium 2300) for storing/recording steps of a program of a method according to the present invention.
Figure 22:
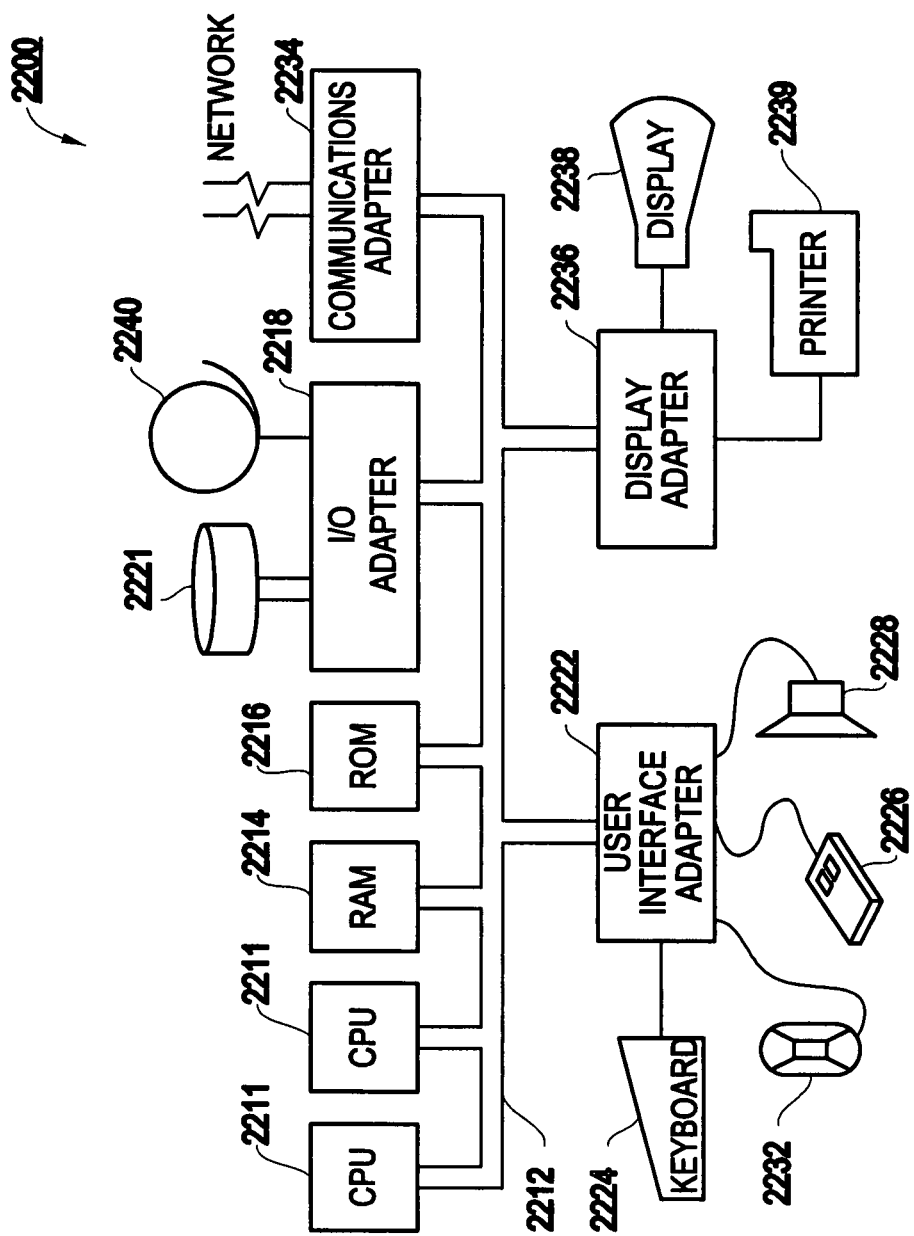
FIG. 22 illustrates an exemplary hardware/information handling system 2200 for incorporating the present invention therein.

FIG. 22 illustrates an exemplary hardware/information handling system 2200 for incorporating the present invention therein, and FIG. 23 illustrates a computer-readable medium 2300 (e.g., signal-bearing medium, storage medium, etc.) for storing steps of a program of a method according to the present invention.

FIG. 22 illustrates a typical hardware configuration of an information handling/computer system for use with the invention and which preferably has at least one processor or central processing unit (CPU) 2211.

The CPUs 2211 are interconnected via a system bus 2212 to a random access memory (RAM) 2214, read-only memory (ROM) 2216, input/output (I/O) adapter 2218 (for connecting peripheral devices such as disk units 2221 and tape drives 2240 to the bus 2212), user interface adapter 2222 (for connecting a keyboard 2224, mouse 2226, speaker 2228, microphone 2232, and/or other user interface device to the bus 2212), a communication adapter 2234 for connecting an information handling system to a data processing network, the Internet, an Intranet, a personal area network (PAN), etc., and a display adapter 2236 for connecting the bus 2212 to a display device 2238 and/or printer 2239.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This computer-readable media or signal-bearing media may include, for example, a RAM contained within the CPU 2211, as represented by the fast-access storage for example. Alternatively, the instructions may be contained in another computer-readable media or signal-bearing media, such as a data storage disk/diskette 2300 (FIG. 23), directly or indirectly accessible by the CPU 2211.

Whether contained in the disk/diskette 2300, the computer/CPU 2211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable computer-readable media or signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary aspects, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of capturing business dashboard model requirements at a business model level, the method comprising:
   one of defining one or more custom reports or selecting one or more predefined report templates;
   providing, using a computer processor, at least one user-customizable model for capturing functionality of a dashboard, said providing at least one user-customizable model comprising modeling reporting requirements based on said one or more custom reports or said one or more predefined report templates; and
   after said user defines the functionality of the dashboard using said at least one user-customizable model, transforming the at least one user-customizable model into a meta-model, automatically generating code for a deployable dashboard application based on said meta-model,
   wherein the generated code defines:
      management of data to be displayed by the dashboard, wherein said management includes creating databases and access to said databases;
      design of views of the data by the dashboard;
      navigation among said views of the dashboard; and
      assignment of access privileges to users of the dashboard, wherein each of said users can only access respective data and views that are relevant to said each of said users.

2. The method according to claim 1, wherein said models define at least one of:
   data to be displayed by said dashboard, users of said dashboard, roles and access privileges of said users, content of each dashboard page view, and navigation among dashboard page views.

3. The method according to claim 1, wherein said models define at least one of a definition of metrics and related context information to be displayed on the dashboard, organization of dashboard information into pages, and definition of navigation paths among said pages, and assignment of access control privileges to the dashboard information, based on user roles.

4. The method according to claim 1, wherein said at least one user-customizable model includes at least one of a model for modeling data, a model for modeling users and the user's data access privileges, and a model for modeling navigation among data views.

5. The method according to claim 1, further comprising:
   capturing artifacts of at least one of the user-customizable models from a storage unit.

6. The method according to claim 1, wherein said dashboard comprises:
   a business performance management (BPM) dashboard.

7. The method according to claim 1, wherein the deployable dashboard application includes a software component for transformation of at least one of:
   models to meta models; and
   meta models to a deployable component.

8. The method according to claim 1, further comprising:
   grouping artifacts as metagroups of said at least one user-customizable model.

9. The method according to claim 1, further comprising:
   defining at least one of report templates and page navigation of said at least one user-customizable model.

10. The method according to claim 1, further comprising:
    defining users' roles and said users' access in said at least one user-customizable model as at least one of:
    a User Role to a Metric Group; and
    a User Role to a Page Template and Navigation.

11. The method according to claim 1, further comprising:
    capturing a User Role to Fine grained Data Access of said at least one user-customizable model.

12. A tool for capturing said business dashboard model requirements at said business model level and automatically generating said code for said deployable dashboard application, according to claim 1, wherein said tool comprises a Rational Software Architect (RSA) Modeler.

13. An Extensible Markup Language (XML) Schema for capturing said business model requirements at said business model level and automatically generating said code for said deployable dashboard application, according to claim 1, wherein said Extensible Markup Language (XML) Schema defines an Information Technology (IT) Meta Model for capturing said at least one user-customizable model.

14. A tangible computer-readable medium embodying a program of recordable, machine-readable instructions executable by a digital processing apparatus to perform the method according to claim 1.

15. A method of deploying computing infrastructure in which computer-readable code is integrated into a computing system, and combines with said computing system to perform the method according to claim 1.

16. A system for model-driven dashboard design, said system comprising:
   a storage device for storing predefined report templates;
   at least one user-customizable model that captures functionality of a dashboard, the at least one user-customizable model comprising modeling reporting requirements based on one or more custom reports or one or more of said predefined report templates; and
   a dashboard code generator that automatically generates code for a deployable dashboard application based on a meta-model after a user defines the functionality of the dashboard using said at least one user-customizable model and transforming the at least one user-customizable model into the meta-model,
   wherein the generated code defines:
      management of data to be displayed by the dashboard, wherein said management includes creating databases and access to said databases;
      design of views of the data by the dashboard;
      navigation among said views of the dashboard; and
      assignment of access privileges to users of the dashboard, wherein each of said users can only access respective data and views that are relevant to said each of said users.

17. The system according to claim 16, further comprising:
    a dashboard model editor for editing said at least one user-customizable model to include a dashboard report requirement based on artifacts of the at least one user-customizable model retrieved from a storage unit; and
    a dashboard meta-model translator that transforms the at least one user-customizable model into a meta-model,
    wherein said dashboard code generator automatically generates said dashboard code for creating said deployable application based on said meta-model.

18. A dashboard framework for capturing business dashboard model requirements at a business model level and automatically generating code for a deployable dashboard application, said dashboard framework comprising:
    a computer processor comprising a dashboard model editor that edits a formal model that represents a dashboard report requirement based on artifacts of the formal model retrieved from a storage unit, wherein the formal model captures functionality of the dashboard;
    a dashboard meta-model translator that transforms the formal model into a meta-model; and
    a dashboard code generator that automatically generates dashboard code for creating said deployable application, wherein the generated code defines:
       management of data to be displayed by the dashboard, wherein said management includes creating databases and access to said databases;
       design of views of the data by the dashboard;
       navigation among said views of the dashboard; and
       assignment of access privileges to users of the dashboard, wherein each of said users can only access respective data and views that are relevant to said each of said users.

* * * * *